United States Patent
Tayebati et al.

(10) Patent No.: US 11,204,506 B2
(45) Date of Patent: *Dec. 21, 2021

(54) POLARIZATION-ADJUSTED AND SHAPE-ADJUSTED BEAM OPERATION FOR MATERIALS PROCESSING

(71) Applicants: Parviz Tayebati, Sherborn, MA (US); Bien Chann, Merrimack, NH (US); Wang-Long Zhou, Andover, MA (US); Francisco Villarreal-Saucedo, Middleton, MA (US); Robin Huang, North Billerica, MA (US)

(72) Inventors: Parviz Tayebati, Sherborn, MA (US); Bien Chann, Merrimack, NH (US); Wang-Long Zhou, Andover, MA (US); Francisco Villarreal-Saucedo, Middleton, MA (US); Robin Huang, North Billerica, MA (US)

(73) Assignee: TERADIODE, INC., Wilmington, MA (US)

(*) Notice: Subject to any disclaimer, the term of this patent is extended or adjusted under 35 U.S.C. 154(b) by 1169 days.

This patent is subject to a terminal disclaimer.

(21) Appl. No.: 15/261,096

(22) Filed: Sep. 9, 2016

(65) Prior Publication Data

US 2017/0052381 A1  Feb. 23, 2017

Related U.S. Application Data

(63) Continuation-in-part of application No. 15/188,076, filed on Jun. 21, 2016, now Pat. No. 10,401,633, (Continued)

(51) Int. Cl.
*G02B 27/09* (2006.01)
*B23K 26/073* (2006.01)
(Continued)

(52) U.S. Cl.
CPC ........ *G02B 27/0955* (2013.01); *B23K 26/073* (2013.01); *G02B 5/001* (2013.01);
(Continued)

(58) Field of Classification Search
CPC ............ G02B 27/0955; G02B 27/0927; G02B 5/3083; B23K 26/08; B23K 26/064; B23K 26/21; B23K 26/0604; B23K 26/38
(Continued)

(56) References Cited

U.S. PATENT DOCUMENTS 5,583,342 A   12/1996  Ichie
9,889,524 B2 * 2/2018  Tayebati ............ B23K 26/0604
(Continued)

FOREIGN PATENT DOCUMENTS

JP   20110119026   6/2011

OTHER PUBLICATIONS

International Search Report, for International Application No. PCT/US2017/042089, dated Oct. 20, 2017, 15 pages.

*Primary Examiner* — Tu B Hoang
*Assistant Examiner* — Alba T Rosario-Aponte
(74) *Attorney, Agent, or Firm* — Morgan, Lewis & Bockius LLP

(57) ABSTRACT

In various embodiments, laser delivery systems feature variable polarizers and beam shapers for altering the polarization and/or shape of the output beam for processing of various materials. The polarization and/or shape of the beam may be varied based on one or more characteristics of the workpiece.

29 Claims, 31 Drawing Sheets

Related U.S. Application Data which is a continuation-in-part of application No. 14/639,401, filed on Mar. 5, 2015, now Pat. No. 9,889,524.

(60) Provisional application No. 62/183,210, filed on Jun. 23, 2015, provisional application No. 61/948,205, filed on Mar. 5, 2014.

(51) Int. Cl.
*G02B 5/00* (2006.01)
*G02B 27/28* (2006.01)
*G02B 5/30* (2006.01)

(52) U.S. Cl.
CPC ....... *G02B 27/0927* (2013.01); *G02B 27/286* (2013.01); *G02B 5/3083* (2013.01)

(58) Field of Classification Search
USPC .................................................. 219/121.64
See application file for complete search history.

(56) References Cited

U.S. PATENT DOCUMENTS

| | | | |
|---|---|---|---|
| 2002/0000428 A1* | 1/2002 | Dulaney | B23K 26/06 219/121.69 |
| 2006/0086459 A1* | 4/2006 | Koga | B23K 26/066 156/345.19 |
| 2008/0291232 A1* | 11/2008 | Yamada | B41J 2/04508 347/14 |
| 2009/0233456 A1* | 9/2009 | Tsukihara | G02B 27/0905 438/795 |
| 2010/0176102 A1* | 7/2010 | Petring | B23K 26/0604 219/121.72 |
| 2012/0325784 A1* | 12/2012 | Moffatt | B23K 26/03 219/121.61 |
| 2013/0161312 A1* | 6/2013 | Im | H01L 21/268 219/385 |
| 2015/0253676 A1 | 9/2015 | Sato et al. | |

\* cited by examiner

POLARIZATION-ADJUSTED AND SHAPE-ADJUSTED BEAM OPERATION FOR MATERIALS PROCESSING

RELATED APPLICATIONS

This application is (i) a continuation-in-part of U.S. patent application Ser. No. 14/639,401, filed Mar. 5, 2015, which claims the benefit of and priority to U.S. Provisional Patent Application No. 61/948,205, filed Mar. 5, 2014, and (ii) a continuation-in-part of U.S. patent application Ser. No. 15/188,076, filed Jun. 21, 2016, which claims the benefit of and priority to U.S. Provisional Patent Application No. 62/183,210, filed Jun. 23, 2015. The entire disclosure of each of these references is hereby incorporated herein by reference.

TECHNICAL FIELD

In various embodiments, the present invention relates to laser systems, specifically laser systems with controllable beam parameter products and/or beam polarizations for the processing of materials.

BACKGROUND

High-power lasers are used in many cutting, etching, annealing, welding, drilling, and soldering applications. As in any materials-processing operations, efficiency can be a critical limiting factor in terms of expense and time; the lower the efficiency, the higher will be the cost and/or the slower will be the operation of the laser deployed to process a given material. The brightness and polarization of the laser beam can influence efficiency, and different materials (such as copper, aluminum, steel, and so forth) respond differently to beam polarization as they are processed. Moreover, the thicknesses of these materials can affect their polarization response. That is, the nature of a cut or weld may vary with the beam polarization depending on the material and its thickness. For example, a linearly polarized processing beam may be absorbed differently depending on the orientation of the beam's polarization with respect to the cut front. For this reason, laser-processing systems sometimes utilize circularly or randomly polarized laser output in order to avoid directionally dependent polarization responses. While that approach avoids the efficiency-degrading results of unfavorable polarization orientations, it likewise precludes the benefits of favorable orientations.

In addition, high-power laser systems often include a laser emitter, the laser light from which is coupled into an optical fiber (or simply a "fiber"), and an optical system that focuses the laser light from the fiber onto the workpiece to be processed. The optical system is typically engineered to produce the highest-quality laser beam, or, equivalently, the beam with the lowest beam parameter product (BPP). The BPP is the product of the laser beam's divergence angle (half-angle) and the radius of the beam at its narrowest point (i.e., the beam waist, the minimum spot size). The BPP quantifies the quality of the laser beam and how well it can be focused to a small spot, and is typically expressed in units of millimeter-milliradians (mm-mrad). (BPP values disclosed herein are in units of mm-mrad unless otherwise indicated.) A Gaussian beam has the lowest possible BPP, given by the wavelength of the laser light divided by pi. The ratio of the BPP of an actual beam to that of an ideal Gaussian beam at the same wavelength is denoted $M^2$, which is a wavelength-independent measure of beam quality.

In many laser-processing applications, the desired beam spot size, divergence, and beam quality may vary depending on, for example, the type of processing and/or the type of material being processed. In order to make such changes to the BPP of the laser system, frequently the output optical system or the optical fiber must be swapped out with other components and/or realigned, a time-consuming and expensive process that may even lead to inadvertent damage of the fragile optical components of the laser system.

Accordingly, there is a need for improved systems and techniques for enhancing the efficiency of laser processing operations that exploit the varying responses to beam polarization and/or other beam characteristics (e.g., BPP) that characterize different materials and material thicknesses.

SUMMARY

Embodiments of the invention provide systems and techniques for altering and optimizing the polarization and/or other characteristics (e.g., BPP, shape) of a beam during processing, and maintaining the optimal characteristics of the beam throughout processing—e.g., even as the beam path varies or the nature or thickness of the material changes.

Embodiments of the invention may alter the polarization of the beam as the thickness of the workpiece changes and/or for workpieces of different thicknesses. For example, the circularity (i.e., the degree of change from linear to elliptical to circular, where any number of ellipses of varying dimensions and curvatures are possible between fully linear and fully circular) of the polarization of the beam may be altered to make the beam more circular (e.g., linear to elliptical, less circular ellipse to more circular ellipse, elliptical to circular, etc.) as the thickness of the workpiece increases. (In various embodiments, the circularity of the polarization is inversely related to the eccentricity of the elliptical polarization, where an eccentricity of 0 represents circular polarization and an eccentricity of 1 represents linear polarization.) In various embodiments, the polarization state of the beam is altered at least in part via use of a Babinet-Soleil compensator, which enables continuously variable polarization of any degree of eccentricity. Embodiments of the invention may also vary the polarization of the beam from linear to radial in order to, e.g., enable focusing of the beam to a smaller spot size.

Embodiments of the present invention use optical elements capable of laser beam shaping to achieve desired spatial beam profiles that modify beam quality (particularly BPP) and/or the shape of the beam. More specifically, changing the optical geometry of optical elements by moving or displacing their position transverse or longitudinal to the optical axis of the laser beam may be utilized to vary shape and/or BPP. In embodiments of the invention, optical elements are located in the beam path with switchable states, producing different beam deflections or diffractions, depending on their position. The use of optical elements in accordance with embodiments of the present invention enables variation of shape and/or BPP regardless the shape, quality, wavelength, bandwidth, and number of beams corresponding to the input laser beam(s). The output beam with controllably variable shape and/or BPP may be utilized to process a workpiece in such applications as welding, cutting, drilling, etc.

One advantage of variable shape and/or BPP is improved laser application performance for different types of processing techniques or different types of materials being processed. Embodiments of the invention may also utilize various techniques for varying BPP and/or shape of laser beams described in U.S. patent application Ser. No. 14/632,283, filed on Feb. 26, 2015, U.S. patent application Ser. No. 14/747,073, filed Jun. 23, 2015, U.S. patent application Ser. No. 14/852,939, filed Sep. 14, 2015, U.S. patent application Ser. No. 15/188,076, filed Jun. 21, 2016, U.S. Provisional Patent Application No. 62/318,959, filed Apr. 6, 2016, and U.S. Provisional Patent Application No. 62/362,824, filed Jul. 15, 2016, the disclosure of each of which is incorporated in its entirety herein by reference. In addition, differing beam intensity distribution that is induced by optical elements (refractive optics) modifies beam quality and, therefore, BPP. By using translation (e.g., motorized translation) of the optical elements that have different effective optical geometries in the beam path, real-time dynamic changes of shape and/or BPP may be realized.

Laser beam shaping is the process of redistributing the intensity (irradiance) and phase of the beam. The intensity distribution defines the beam profile, such as Gaussian, Bessel, annular, multimode, rectangular, top-hat, elliptical or circular, and different intensity profiles may be critical and necessary for specific laser materials processing techniques. In embodiments of this invention, the optical element is located in the delivery system that delivers the laser beam to the workpiece and focuses the laser. The delivery system may be configured and/or packaged as, for example, at least a portion of a cutting head or a welding head. Embodiments of the invention vary the beam quality in order to enable a controllably variable shape and/or BPP at the work station (and/or at the workpiece disposed thereon). The variable shape and/or BPP module may include one or more optical elements, a motorized translating stage, a collimating lens, and a focusing lens. Embodiments of the invention may feature any one or more of multiple types of refractive optics for the optical elements are used to vary shape and/or BPP.

Embodiments of the invention vary beam quality by dynamically changing the position of one or more optical elements in the optical path of the laser beam. In one embodiment, the beam profile is tailored by adjusting the beam pointing position on the optical element. The optical elements may have different geometries dependent on a desired beam profile and, therefore, BPP. One optical element in accordance with embodiments of the invention has a planar surface and a flat-top (i.e., truncated) cone shaped surface. Another optical element in accordance with embodiments of the invention has a planar surface and a flat-top spherical shaped surface. Yet another optical element in accordance with embodiments of the invention is a meniscus lens. The diverging light rays from the beam delivery fiber are directed towards the optical element(s) to redistribute beam intensity within the optical elements. Other optical elements in accordance with embodiments of the invention include paired positive and negative axicon lenses. In other embodiments, optical elements include twinned, complementary phase-plate lenses, one of which has a partially convex surface and one of which has a complementarily partially concavely curved surface. The edges of the optical elements may be rounded off in order to suppress diffraction effects. The advantages of dynamic variation of BPP with the automated movement of optical elements may be applied to, for example, laser-cutting applications on round-cut or square-cut corners where BPP changes during free-form cutting are required. Such advantages may also be applied to laser-drilling applications that may utilize the ability to vary both BPP and focal length. Automated closed-loop motor control of optical elements in accordance with embodiments of the invention produces reliable and repeatable performance and enables precise control of optics position, thereby providing accurate BPP variation.

Herein, "optical elements" may refer to any of lenses, mirrors, prisms, gratings, and the like, which redirect, reflect, bend, or in any other manner optically manipulate electromagnetic radiation, unless otherwise indicated. Herein, beam emitters, emitters, or laser emitters, or lasers include any electromagnetic beam-generating device such as semiconductor elements, which generate an electromagnetic beam, but may or may not be self-resonating. These also include fiber lasers, disk lasers, non-solid state lasers, etc. Generally, each emitter includes a back reflective surface, at least one optical gain medium, and a front reflective surface. The optical gain medium increases the gain of electromagnetic radiation that is not limited to any particular portion of the electromagnetic spectrum, but that may be visible, infrared, and/or ultraviolet light. An emitter may include or consist essentially of multiple beam emitters such as a diode bar configured to emit multiple beams. The input beams received in the embodiments herein may be single-wavelength or multi-wavelength beams combined using various techniques known in the art.

Embodiments of the invention may be utilized with wavelength beam combining (WBC) systems that include a plurality of emitters, such as one or more diode bars, that are combined using a dispersive element to form a multi-wavelength beam. Each emitter in the WBC system individually resonates, and is stabilized through wavelength-specific feedback from a common partially reflecting output coupler that is filtered by the dispersive element along a beam-combining dimension. Exemplary WBC systems are detailed in U.S. Pat. No. 6,192,062, filed on Feb. 4, 2000, U.S. Pat. No. 6,208,679, filed on Sep. 8, 1998, U.S. Pat. No. 8,670,180, filed on Aug. 25, 2011, and U.S. Pat. No. 8,559,107, filed on Mar. 7, 2011, the entire disclosure of each of which is incorporated by reference herein. Multi-wavelength output beams of WBC systems may be utilized as input beams in conjunction with embodiments of the present invention for, e.g., BPP, shape, and/or polarization control.

In an aspect, embodiments of the invention feature a system for processing a workpiece. The system includes, consists essentially of, or consists of a beam emitter, a positioning device for varying a position of a beam of the beam emitter with respect to the workpiece, a variable polarizer for varying a polarization of the beam, a beam shaper for varying a shape of the beam, and a controller, coupled to the positioning device, the polarizer, and the beam shaper, for operating the beam emitter cause the beam to traverse a path across at least a portion of the workpiece for processing thereof, and to vary the polarization and/or shape of the beam along the path based at least in part on one or more properties of the workpiece.

Embodiments of the invention may include one or more of the following in any of a variety of combinations. The controller may be configured to maintain a linear polarization of the beam having a polarization direction approximately parallel to the path as the beam traverses the path. The controller may be configured to vary an eccentricity of the polarization of the beam based at least in part on a thickness of the workpiece. The controller may be configured to vary the polarization of the beam between a linear polarization state and a radial polarization state. The variable polarizer may include, consist essentially of, or consist of a wave plate. The variable polarizer may include, consist essentially of, or consist of a wave plate and a rotation element, the rotation element being operated by the controller. The wave plate may include, consist essentially of, or consist of a half-wave plate and/or a quarter-wave plate. The beam may be linearly polarized. The controller may operate the rotation element to maintain a polarization direction parallel to the path. The variable polarizer may include, consist essentially of, or consist of a compensator plate, a fixed birefringent wedge disposed over the compensator plate, and a movable birefringent wedge disposed over the fixed birefringent wedge. The variable polarizer may include, consist essentially of, or consist of a compensator plate, a fixed birefringent wedge disposed over the compensator plate, a movable birefringent wedge disposed over the fixed birefringent wedge, and a translation element, the translation element being operated by the controller. The variable polarizer may include, consist essentially of, or consist of a radial polarization converter.

The system may include a memory, accessible to the controller, for storing data corresponding to the path, and a database for storing polarization data for a plurality of materials. The controller may be configured to query the database to obtain the polarization data for a material of the workpiece and to vary the polarization of the beam based at least in part on the polarization data. The path may include at least one directional change. The workpiece may have at least two portions having different thicknesses. The workpiece may have at least two portions that include, consist essentially of, or consist of different materials. The beam emitter may include, consist essentially of, or consist of a beam source emitting a plurality of discrete input beams, focusing optics for focusing the plurality of input beams onto a dispersive element, a dispersive element for receiving and dispersing the received focused beams, and a partially reflective output coupler positioned to receive the dispersed beams, transmit a portion of the dispersed beams therethrough as the beam of the beam emitter, and reflect a second portion of the dispersed beams back toward the dispersive element. The beam (e.g., the output processing beam) of the beam emitter may be composed of multiple wavelengths.

The beam shaper may include, consist essentially of, or consist of a collimating lens for collimating a beam received from the beam emitter, a focusing lens for receiving the collimated beam and focusing the beam toward the workpiece, disposed between the beam source and the collimating lens, an optical element for receiving the beam and altering the shape thereof, and a lens manipulation system for changing a position of the optical element within a path of the beam. The controller may be configured to control the lens manipulation system to vary the shape of the beam. The optical element may include, consist essentially of, or consist of a lens having (i) a first surface having the shape of a truncated cone, and (ii) opposite the first surface, a second surface that is substantially planar. The optical element may include, consist essentially of, or consist of a lens having (i) a first surface having the shape of a truncated sphere, and (ii) opposite the first surface, a second surface that is substantially planar. The optical element may include, consist essentially of, or consist of a meniscus lens. The lens manipulation system may be configured to position the optical element transversely off-center within the path of the beam. The system may include a second optical element disposed between the focusing lens and the workpiece. The lens manipulation system may be configured to change a position of the second optical element within the path of the beam. The second optical element may include, consist essentially of, or consist of a lens having (i) a first surface having the shape of a truncated cone, and (ii) opposite the first surface, a second surface that is substantially planar. The second optical element may include, consist essentially of, or consist of a lens having (i) a first surface having the shape of a truncated sphere, and (ii) opposite the first surface, a second surface that is substantially planar. The second optical element may include, consist essentially of, or consist of a meniscus lens.

The beam shaper may include, consist essentially of, or consist of a collimating lens for collimating a beam received from the beam emitter, a focusing lens for receiving the collimated beam and focusing the beam toward the workpiece, disposed between the beam source and the collimating lens, first and second optical elements for receiving the beam and altering the shape thereof, and a lens manipulation system for changing (i) a position of the first optical element within a path of the beam, (ii) a position of the second optical element within the path of the beam, and/or (iii) a distance between the first and second optical elements. The controller may be configured to control the lens manipulation system to vary the shape of the beam. The first optical element may include, consist essentially of, or consist of a double-concave axicon lens. The second optical element may include, consist essentially of, or consist of a double-convex axicon lens. The lens manipulation system may be configured to change the distance between the first and second optical elements within the range of approximately 0 mm to approximately 20 mm. The first optical element may include, consist essentially of, or consist of a lens having (i) a first surface that is substantially planar, and (ii) opposite the first surface, a second surface having (a) a first portion that is convexly curved and (b) a second portion that is substantially planar. The second optical element may include, consist essentially of, or consist of a lens having (i) a first surface that is substantially planar, and (ii) opposite the first surface, a second surface having (a) a first portion that is concavely curved and (b) a second portion that is substantially planar. The lens manipulation system may be configured to position the first optical element and/or the second optical element transversely off-center within the path of the beam.

In an aspect, embodiments of the invention relate to a system for processing a workpiece. In various embodiments, the system comprises a beam emitter, a positioning device for varying a position of a beam of the beam emitter with respect to the workpiece, a variable polarizer for varying a polarization of the beam, and a controller, coupled to the positioning device and the polarizer, for operating the beam emitter cause the beam to traverse a path across at least a portion of the workpiece for processing thereof and to maintain a consistent polarization of the beam with respect to the workpiece along the path.

In various embodiments, the variable polarizer comprises a wave plate and a rotation element, the rotation element being operated by the controller. For example, the wave plate may be one or more half-wave plates, one or more quarter-wave plates, or some combination thereof. The beam may, for example, be linearly polarized, with the controller operating the rotation element to maintain a polarization direction parallel to the path.

In some embodiments, the system further comprises a memory, accessible to the controller, for storing data corresponding to the path, and a database for storing polarization data for a plurality of materials. The controller is configured to query the database to obtain the polarization data for a material of the workpiece, and the polarization data determines the consistent polarization of the beam. The path may include at least one directional change.

The beam emitter may emit a plurality of beams. The beam emitter may be at least one laser and/or at least one polarized fiber.

In another aspect, the invention pertains to a method of processing a workpiece. In various embodiments, the method comprises the steps of operating a beam emitter to direct a beam traversing a path along the workpiece to process the workpiece, where the beam has an output polarization; and altering the output polarization along at least a portion of the path so as to maintain a consistent polarization of the beam with respect to the workpiece throughout processing thereof.

The step of processing the workpiece may comprise one or more of cutting, welding, soldering, drilling, or etching the workpiece. The step of altering may comprise directing the beam through a wave plate and varying a rotation angle of the wave plate with respect to the beam. For example, the wave plate may be one or more half-wave plates and/or one or more quarter-wave plates. The beam may, for example, be linearly polarized, and the altering step maintains a polarization direction of the beam parallel to the path.

In some embodiments, the method further comprises the steps of storing data corresponding to the path, storing polarization data for a plurality of materials, and querying the database to obtain the polarization data for a material of the workpiece, the polarization data determining the consistent polarization of the beam. The path may include at least one directional change.

In an aspect, embodiments of the invention feature a laser delivery system for receiving and altering a spatial power distribution of a radiation beam from a beam source and focusing the radiation with the altered spatial power distribution onto a workpiece. The laser system includes or consists essentially of a collimating lens for collimating the radiation beam, a focusing lens for receiving the collimated beam and focusing the beam toward the workpiece, an optical element for receiving the radiation beam and altering the spatial power distribution thereof, a lens manipulation system for changing a position of the optical element within a path of the radiation beam, and a controller for controlling the lens manipulation system to achieve a target altered spatial power distribution on the workpiece. The optical element may be disposed between the beam source and the collimating lens (i.e., optically downstream of the beam source and optically upstream of the collimating lens).

Embodiments of the invention may include one or more of the following in any of a variety of combinations. The optical element may include, consist essentially of, or consist of a lens having (i) a first surface having the shape of a truncated cone, and (ii) opposite the first surface, a second surface that is substantially planar. The first surface may face the beam source. The first surface may face away from the beam source. The optical element may include, consist essentially of, or consist of a lens having (i) a first surface having the shape of a truncated sphere, and (ii) opposite the first surface, a second surface that is substantially planar. The first surface may face the beam source. The first surface may face away from the beam source. The optical element may include, consist essentially of, or consist of a meniscus lens. The meniscus lens may be a positive meniscus lens. The meniscus lens may be a negative meniscus lens. The optical element may include, consist essentially of, or consist of fused silica and/or zinc sulfide. The lens manipulation system may be configured to position the optical element transversely off-center within the path of the radiation beam.

The laser delivery system may include a second optical element disposed in the path of the radiation beam. The second optical element may be disposed between the focusing lens and the workpiece (i.e., disposed optically downstream of the focusing lens and disposed optically upstream of the workpiece). The lens manipulation system may be configured to change a position of the second optical element within the path of the radiation beam. The second optical element may include, consist essentially of, or consist of a lens having (i) a first surface having the shape of a truncated cone, and (ii) opposite the first surface, a second surface that is substantially planar. The first surface may face the beam source. The first surface may face away from the beam source. The second optical element may include, consist essentially of, or consist of a lens having (i) a first surface having the shape of a truncated sphere, and (ii) opposite the first surface, a second surface that is substantially planar. The first surface may face the beam source. The first surface may face away from the beam source. The second optical element may include, consist essentially of, or consist of a meniscus lens. The meniscus lens may be a positive meniscus lens. The meniscus lens may be a negative meniscus lens. The second optical element may include, consist essentially of, or consist of fused silica and/or zinc sulfide.

The beam source may include or consist essentially of a beam emitter emitting a plurality of discrete beams, focusing optics for focusing the plurality of beams onto a dispersive element, a dispersive element for receiving and dispersing the received focused beams, and a partially reflective output coupler positioned to receive the dispersed beams, transmit a portion of the dispersed beams therethrough as the radiation beam, and reflect a second portion of the dispersed beams back toward the dispersive element. The radiation beam may be composed of multiple wavelengths of radiation. The focusing optics may include or consist essentially of one or more cylindrical lenses, one or more spherical lenses, one or more spherical mirrors, and/or one or more cylindrical mirrors. The dispersive element may include or consist essentially of a diffraction grating (e.g., a transmissive diffraction grating or a reflective diffraction grating).

In another aspect, embodiments of the invention feature a laser delivery system for receiving and altering a spatial power distribution of a radiation beam from a beam source and focusing the radiation with the altered spatial power distribution onto a workpiece. The laser delivery system includes or consists essentially of a collimating lens for collimating the radiation beam, a focusing lens for receiving the collimated beam and focusing the beam toward the workpiece, first and second optical elements for receiving the radiation beam and altering the spatial power distribution thereof, a lens manipulation system for changing (i) a position of the first optical element within a path of the radiation beam, (ii) a position of the second optical element within the path of the radiation beam, and/or (iii) a distance between the first and second optical elements, and a controller for controlling the lens manipulation system to achieve a target altered spatial power distribution on the workpiece. The first and/or second optical element may be disposed between the beam source and the collimating lens (i.e., disposed optically downstream of the beam source and optically upstream of the collimating lens).

Embodiments of the invention may include one or more of the following in any of a variety of combinations. The first optical element may include, consist essentially of, or consist of a double-concave axicon lens. The second optical element may include, consist essentially of, or consist of a double-convex axicon lens. The first optical element may be disposed optically upstream of the second optical element. The first optical element may be disposed optically downstream of the second optical element. The lens manipulation system may be configured to change the distance between the first and second optical elements within the range of approximately 0 mm to approximately 50 mm, within the range of approximately 0 mm to approximately 20 mm, within the range of approximately 2 mm to approximately 50 mm, or with the range of approximately 2 mm to approximately 20 mm. The first optical element may include, consist essentially of, or consist of a lens having (i) a first surface that is substantially planar, and (ii) opposite the first surface, a second surface having (a) a first portion that is convexly curved and (b) a second portion that is substantially planar. The second optical element may include, consist essentially of, or consist of a lens having (i) a first surface that is substantially planar, and (ii) opposite the first surface, a second surface having (a) a first portion that is concavely curved and (b) a second portion that is substantially planar. The first optical element may be disposed optically upstream of the second optical element. The first optical element may be disposed optically downstream of the second optical element. The second surface of the first optical element may face the second surface of the second optical element. The first surface of the first optical element may face the first surface of the second optical element. The first surface of the first optical element may face the second surface of the second optical element. The second surface of the first optical element may face the first surface of the first optical element. The lens manipulation system may be configured to position the first optical element and/or the second optical element transversely off-center within the path of the radiation beam. The first optical element may include, consist essentially of, or consist of fused silica and/or zinc sulfide. The second optical element may include, consist essentially of, or consist of fused silica and/or zinc sulfide.

The beam source may include or consist essentially of a beam emitter emitting a plurality of discrete beams, focusing optics for focusing the plurality of beams onto a dispersive element, a dispersive element for receiving and dispersing the received focused beams, and a partially reflective output coupler positioned to receive the dispersed beams, transmit a portion of the dispersed beams therethrough as the radiation beam, and reflect a second portion of the dispersed beams back toward the dispersive element. The radiation beam may be composed of multiple wavelengths of radiation. The focusing optics may include or consist essentially of one or more cylindrical lenses, one or more spherical lenses, one or more spherical mirrors, and/or one or more cylindrical mirrors. The dispersive element may include or consist essentially of a diffraction grating (e.g., a transmissive diffraction grating or a reflective diffraction grating).

In yet another aspect, embodiments of the invention feature a laser delivery system for receiving and altering a spatial power distribution of a radiation beam from a beam source and focusing the radiation with the altered spatial power distribution onto a workpiece. The laser delivery system includes or consists essentially of one or more divergence-increasing optical elements for increasing a divergence of the radiation beam, a focusing lens for receiving the radiation beam and focusing the beam toward the workpiece, at least one optical element for receiving the radiation beam and altering the spatial power distribution thereof, a lens manipulation system for changing a position of the at least one optical element within a path of the radiation beam, and a controller for controlling the lens manipulation system to achieve a target altered spatial power distribution on the workpiece.

Embodiments of the invention may include one or more of the following in any of a variety of combinations. The focusing lens may be disposed optically downstream of the one or more divergence-increasing optical elements. The at least one optical element may be disposed optically upstream of the focusing lens. The one or more divergence-increasing optical elements may include, consist essentially of, or consist of a triple collimator. The triple collimator may include, consist essentially of, or consist of (i) a first plano-concave lens, (ii) a second meniscus lens, and (iii) a third plano-convex lens. The first plano-concave lens may be disposed optically upstream of the second meniscus lens. The second meniscus lens may be disposed optically upstream of the third plano-convex lens. The at least one optical element may be disposed optically downstream of the first plano-concave lens. The at least one optical element may be disposed optically upstream of the second meniscus lens and/or the third plano-convex lens. The at least one optical element may include, consist essentially of, or consist of a lens having (i) a first surface having the shape of a truncated cone, and (ii) opposite the first surface, a second surface that is substantially planar. The at least one optical element may include, consist essentially of, or consist of a lens having (i) a first surface having the shape of a truncated sphere, and (ii) opposite the first surface, a second surface that is substantially planar. The at least one optical element may include, consist essentially of, or consist of a meniscus lens (e.g., a positive meniscus lens or a negative meniscus lens). The lens manipulation system may be configured to position at least one said optical element transversely off-center within the path of the radiation beam.

The at least one optical element may include, consist essentially of, or consist of a first optical element and a second optical element. The first optical element and the second optical element may be separated by a gap therebetween. The lens manipulation system may be configured to change (i) a position of the first optical element within a path of the radiation beam, (ii) a position of the second optical element within the path of the radiation beam, and/or (iii) a distance between the first and second optical elements. The first optical element may include, consist essentially of, or consist of a double-concave axicon lens. The second optical element may include, consist essentially of, or consist of a double-convex axicon lens. The first optical element may be disposed optically upstream of the second optical element. The first optical element may be disposed optically downstream of the second optical element. The lens manipulation system may be configured to change the distance between the first and second optical elements within the range of approximately 0 mm to approximately 50 mm, within the range of approximately 0 mm to approximately 20 mm, within the range of approximately 2 mm to approximately 50 mm, or with the range of approximately 2 mm to approximately 20 mm. The first optical element may include, consist essentially of, or consist of a lens having (i) a first surface that is substantially planar, and (ii) opposite the first surface, a second surface having (a) a first portion that is convexly curved and (b) a second portion that is substantially planar. The second optical element may include, consist essentially of, or consist of a lens having (i) a first surface that is substantially planar, and (ii) opposite the first surface, a second surface having (a) a first portion that is concavely curved and (b) a second portion that is substantially planar. The first optical element may be disposed optically upstream of the second optical element. The first optical element may be disposed optically downstream of the second optical element. The second surface of the first optical element may face the second surface of the second optical element. The first surface of the first optical element may face the first surface of the second optical element. The first surface of the first optical element may face the second surface of the second optical element. The second surface of the first optical element may face the first surface of the first optical element. The lens manipulation system may be configured to position the first optical element and/or the second optical element transversely off-center within the path of the radiation beam. The first optical element may include, consist essentially of, or consist of fused silica and/or zinc sulfide. The second optical element may include, consist essentially of, or consist of fused silica and/or zinc sulfide.

The beam source may include or consist essentially of a beam emitter emitting a plurality of discrete beams, focusing optics for focusing the plurality of beams onto a dispersive element, a dispersive element for receiving and dispersing the received focused beams, and a partially reflective output coupler positioned to receive the dispersed beams, transmit a portion of the dispersed beams therethrough as the radiation beam, and reflect a second portion of the dispersed beams back toward the dispersive element. The radiation beam may be composed of multiple wavelengths of radiation. The focusing optics may include or consist essentially of one or more cylindrical lenses, one or more spherical lenses, one or more spherical mirrors, and/or one or more cylindrical mirrors. The dispersive element may include or consist essentially of a diffraction grating (e.g., a transmissive diffraction grating or a reflective diffraction grating).

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the term "substantially" means±10%, and in some embodiments, ±5%. The term "consists essentially of" means excluding other materials that contribute to function, unless otherwise defined herein. Nonetheless, such other materials may be present, collectively or individually, in trace amounts. Herein, the terms "radiation" and "light" are utilized interchangeably unless otherwise indicated. Herein, "downstream" or "optically downstream," is utilized to indicate the relative placement of a second element that a light beam strikes after encountering a first element, the first element being "upstream," or "optically upstream" of the second element. Herein, "optical distance" between two components is the distance between two components that is actually traveled by light beams; the optical distance may be, but is not necessarily, equal to the physical distance between two components due to, e.g., reflections from mirrors or other changes in propagation direction experienced by the light traveling from one of the components to the other.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Aspects and embodiments relate generally to the field of adjusting polarization and/or shape of a laser beam used in manufacturing, so as to produce better manufacturing results including less dross and clean cuts and welds. In various embodiments, therefore, the present invention relates to optimizing the polarization and/or shape of a laser beam with respect to a material undergoing processing. More particularly, systems and methods for adjusting polarization may involve varying the orientation of a wave plate through which the beam passes in order to selectively vary the polarization thereof, e.g., based on the geometry, material and thickness of the material undergoing processing and the instantaneous orientation of the beam with respect thereto. The approaches and embodiments described herein may apply to single- and dual-beam output systems that use polarization-maintaining optical fibers to deliver the output beams from the laser system to a laser head. In some instances, these laser systems may be wavelength beam-combining systems, which produce a multi-wavelength output beam.

Figure 1:
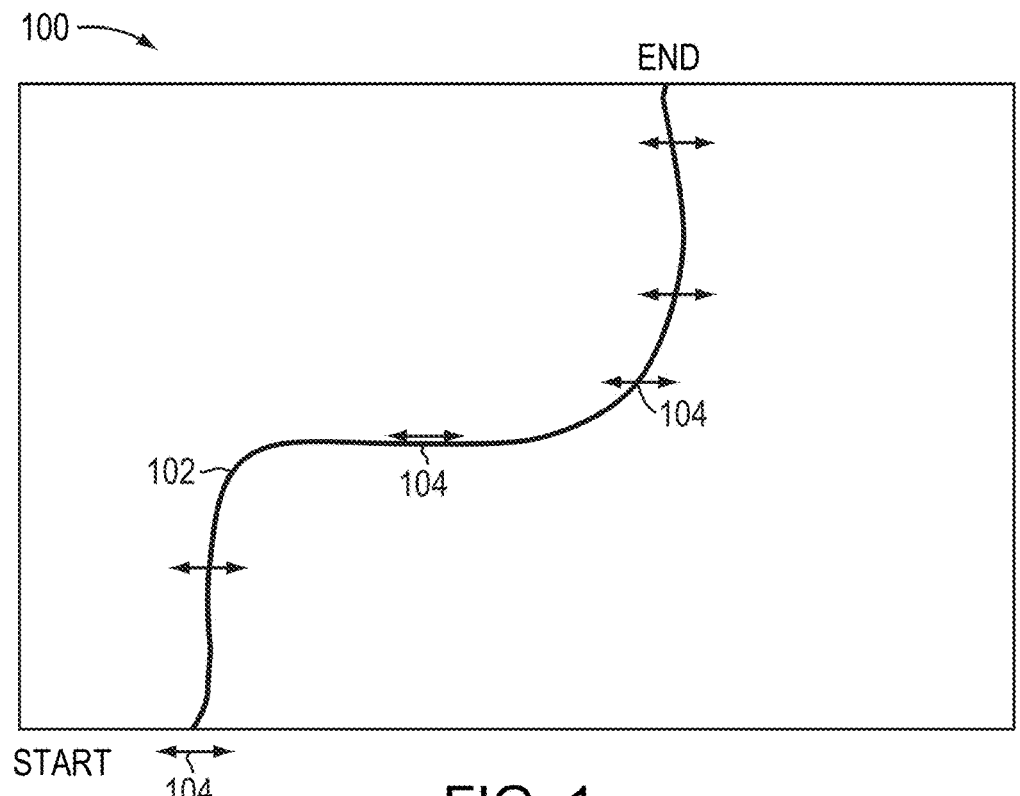
FIG. 1 illustrates a conventional method of cutting a curve out of material with the polarization of the cutting beam being fixed.

Thus, embodiments of the present invention establish an optimal polarization direction for a given material and maintain this direction with respect to the processing direction as processing proceeds. This is in contrast to the behavior of prior-art systems, as exemplified in FIG. 1, that do not alter the polarization direction. In FIG. 1, a sheet 100 of material is processed by a linearly polarized beam that follows a desired cutting path 102, which may be curved. The linear polarization, indicated at 104, maintains a fixed orientation regardless of the varying orientation of the beam relative to the material 100. In many systems, the optimal beam polarization is parallel to the direction of processing. In FIG. 1, this occurs only once, and in fact, at most locations, the polarization is disadvantageously perpendicular to the processing direction. This may retard the processing, produce dross, create an imperfect cut, etc.

Figure 2A:
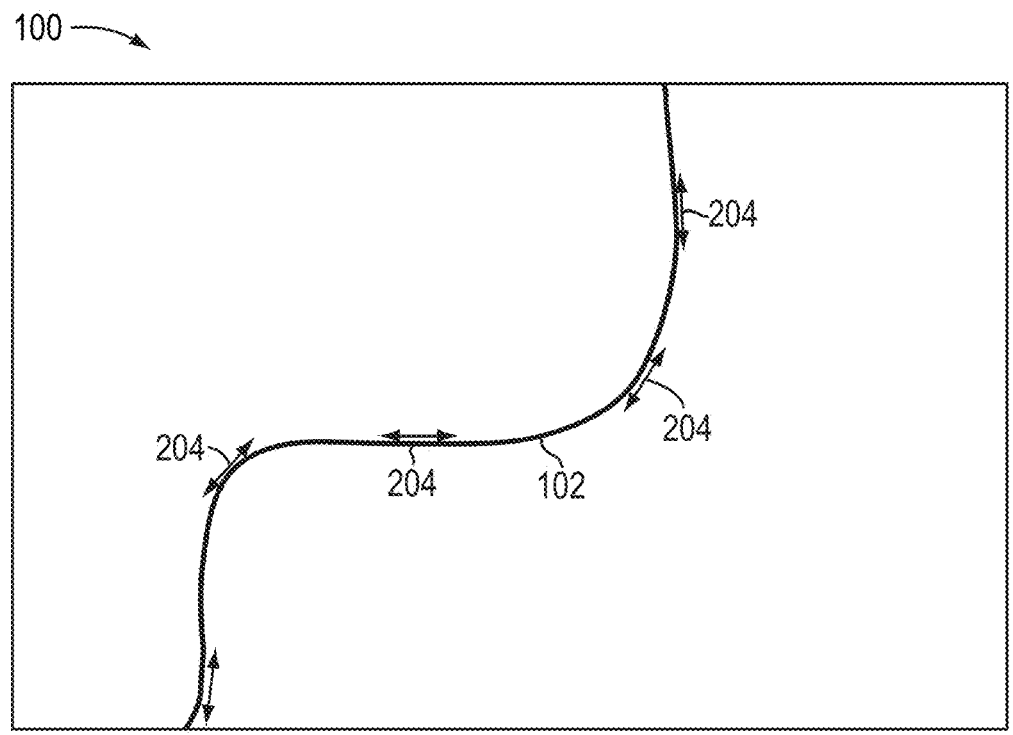
FIG. 2A illustrates an exemplary adjustment of polarization according to the cutting path in the material in accordance with various embodiments of the invention.
Figure 2B:
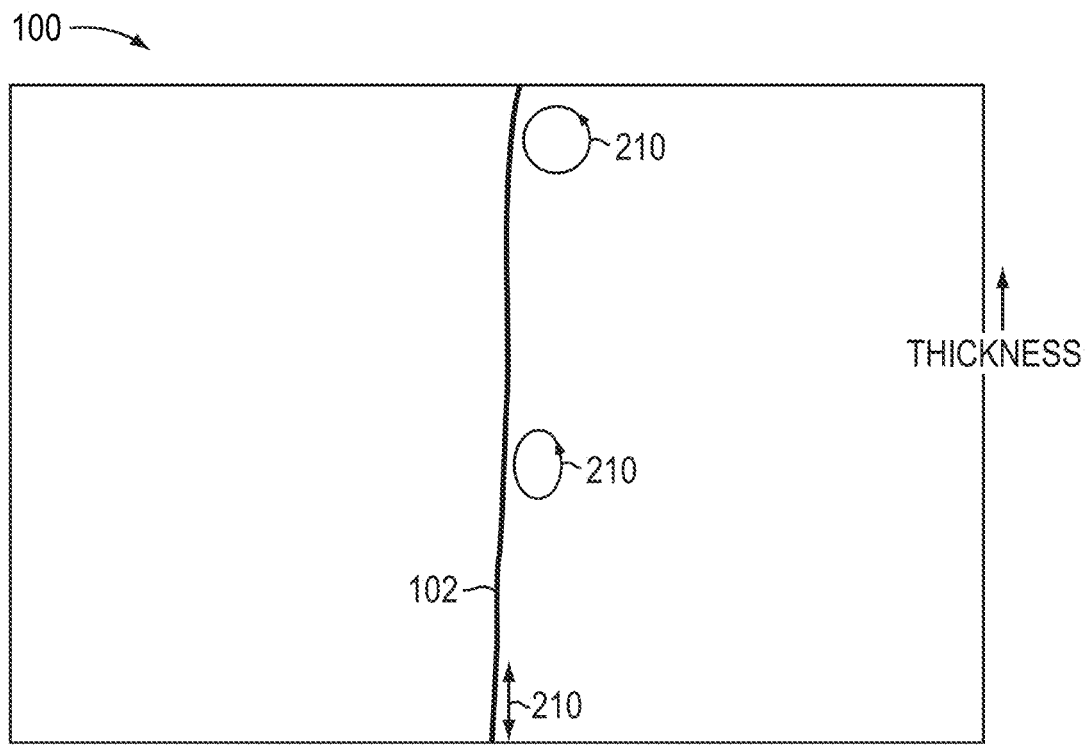
FIG. 2B illustrates an exemplary adjustment of polarization according to the thickness of the material in accordance with various embodiments of the invention.
Figure 2C:
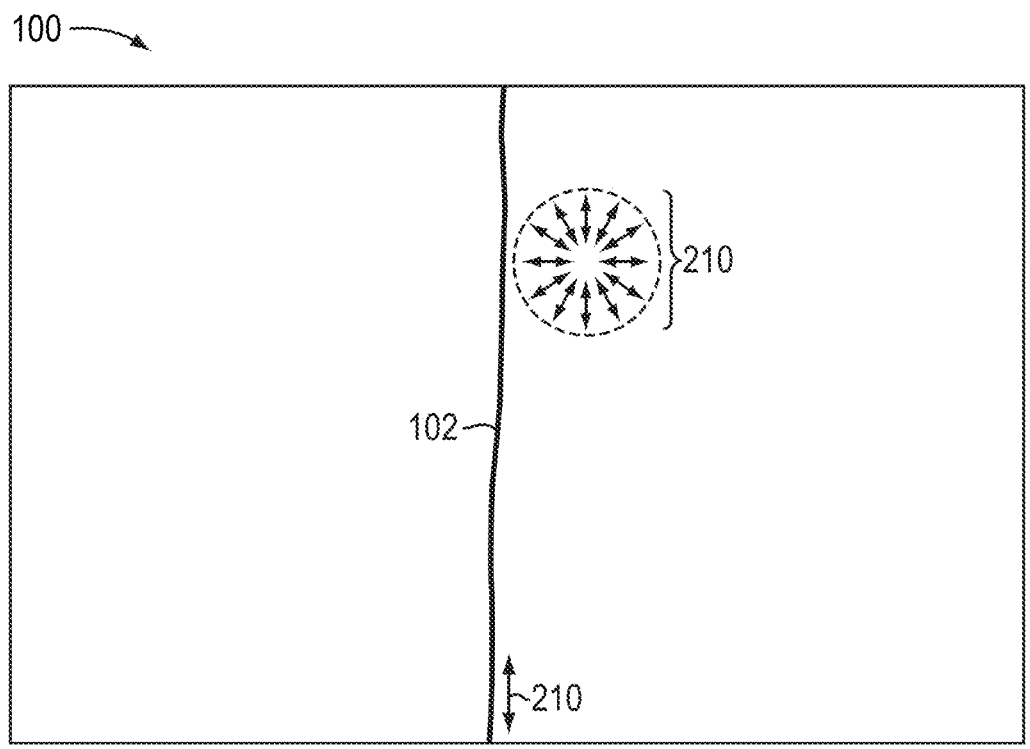
FIG. 2C illustrates an exemplary adjustment of polarization from linear polarization to radial polarization in accordance with various embodiments of the invention.

One optimal behavior for the exemplary system is illustrated FIG. 2A: the polarization orientation 204 of the processing beam remains parallel to the processing direction throughout the processing path 102. Another optimal behavior for the exemplary system is illustrated in FIG. 2B: the polarization state 210 of the processing beam changes from linear polarization to elliptical polarization to circular polarization as the thickness of the material 100 increases. In yet another embodiment, illustrated in FIG. 2C, the polarization state 210 of the processing beam changes from linear polarization to radial polarization along the processing path 102.

Figure 3A:
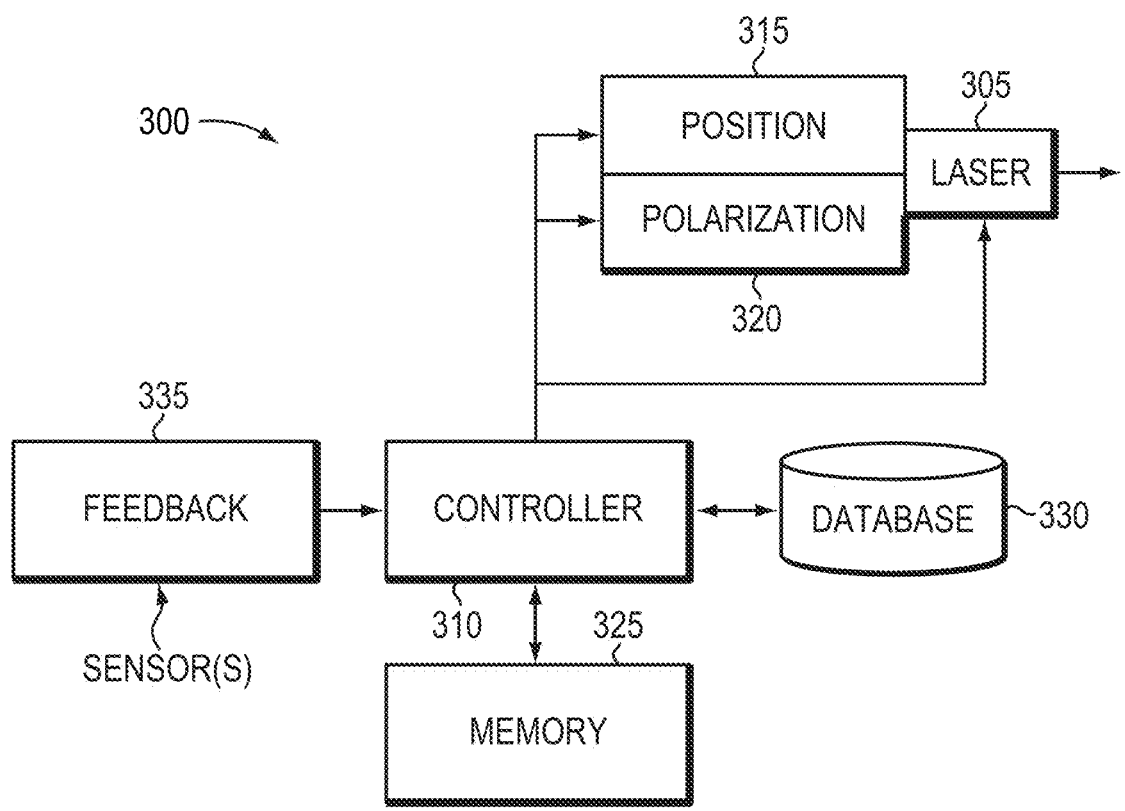
FIGS. 3A-3G illustrate exemplary systems for varying beam polarization based at least in part on processing direction or material thickness in accordance with various embodiments of the invention.
Figure 3B:
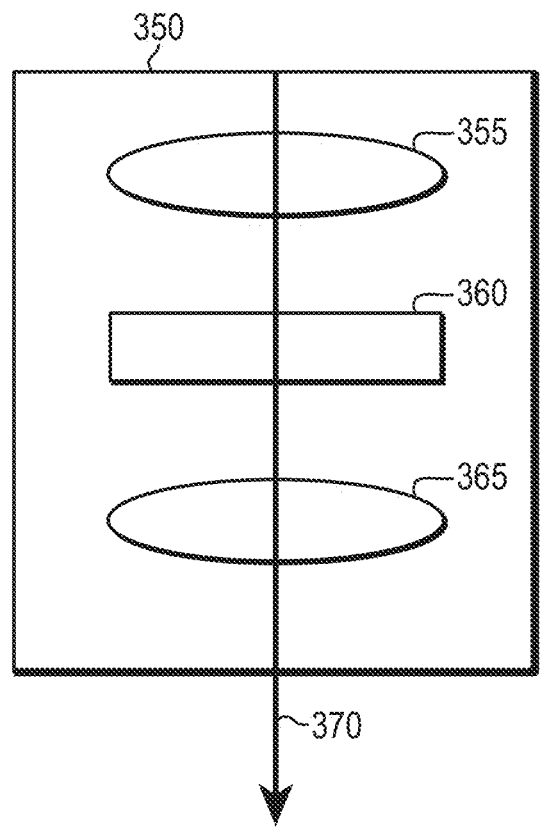
Figure 3C:
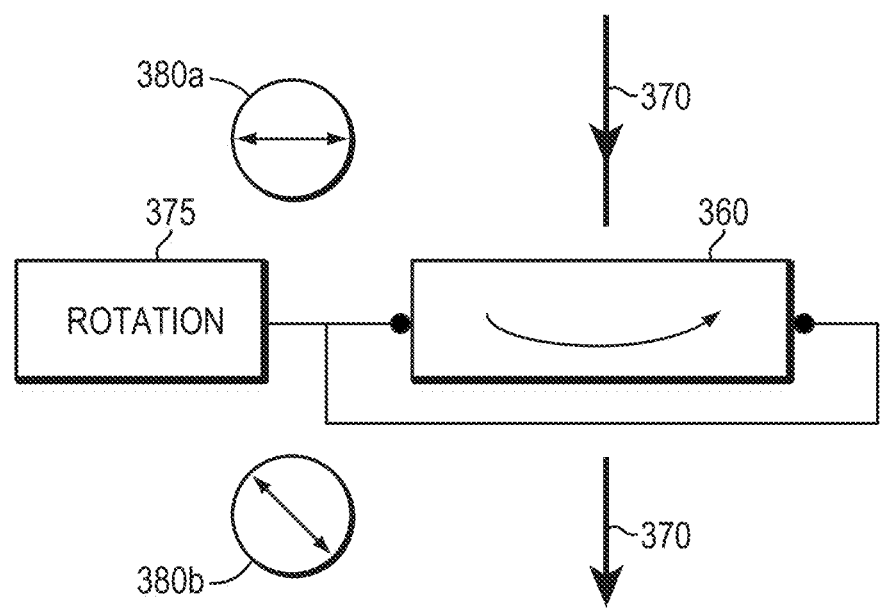

A representative system for accomplishing polarization variations in accordance with embodiments of the present invention is shown in FIGS. 3A-3C. With reference to FIG. 3A, the system 300 includes a laser (or other beam emitter, such as a polarized fiber) 305 and a controller 310. The controller 310 controls the operation of the laser 305 (i.e., it actives the laser 305 and controls beam parameters, such as intensity, as appropriate during processing). The controller also operates a conventional positioning system 315 and a polarization controller 320. The positioning system 315 may be any controllable optical, mechanical or opto-mechanical system for directing the beam through a processing path along a two- or three-dimensional workpiece. During processing, the controller 310 may operate the positioning system 315 and the laser 305 so that the laser beam traverses a processing path along the workpiece. The processing path may be provided by a user and stored in an onboard or remote memory 325, which may also store parameters relating to the type of processing (cutting, welding, etc.) and the beam parameters necessary to carry out that processing. In this regard, a local or remote database 330 may maintain a library of materials and thicknesses that the system 300 will process, and upon user selection of material parameters (type of material, thickness, etc.), the controller 310 queries the database 330 to obtain the corresponding parameter values. The stored values may include a polarization orientation and/or state suitable to the material.

As is well understood in the plotting and scanning art, the requisite relative motion between the beam and the workpiece may be produced by optical deflection of the beam using a movable mirror, physical movement of the laser using a gantry, lead-screw or other arrangement, and/or a mechanical arrangement for moving the workpiece rather than (or in addition to) the beam. The controller 310 may, in some embodiments, receive feedback regarding the position and/or processing efficacy of the beam relative to the workpiece from a feedback unit 335, which will be connected to suitable monitoring sensors. In response to signals from the feedback unit 335, the controller 310 alters the path, composition and/or polarization of the beam.

In one embodiment shown in FIGS. 3B and 3C, polarization adjustment is accomplished within a laser head component 350, which is usually the last opto-mechanical portion of a laser system emitting a beam used in manufacturing. The laser head 350 includes a collimating lens 355, an adjusting/rotating wave plate 360, and a focusing lens 365 to direct beam 370 onto the surface of the workpiece. The wave plate 360 may be a quarter-wave plate, a half-wave plate, or other wave plate for rotating the polarization of the beam 370. With reference to FIGS. 3A-3C, a conventional electro-mechanical rotating device 375 rotates the wave plate 360 under the control of the controller 310 as the beam moves through the processing path 102, thus enforcing a consistent polarization direction of the beam 370 relative to the path 102. In other configurations, multiple wave plates may be employed and separately rotated by individual rotating devices 375. The use of multiple wave plates may improve response time. The polarization of the beam 370 is shown at a first orientation 380a prior to encountering the wave plate 360 and at a second orientation 380b after passing through the wave plate 360.

Figure 3D:
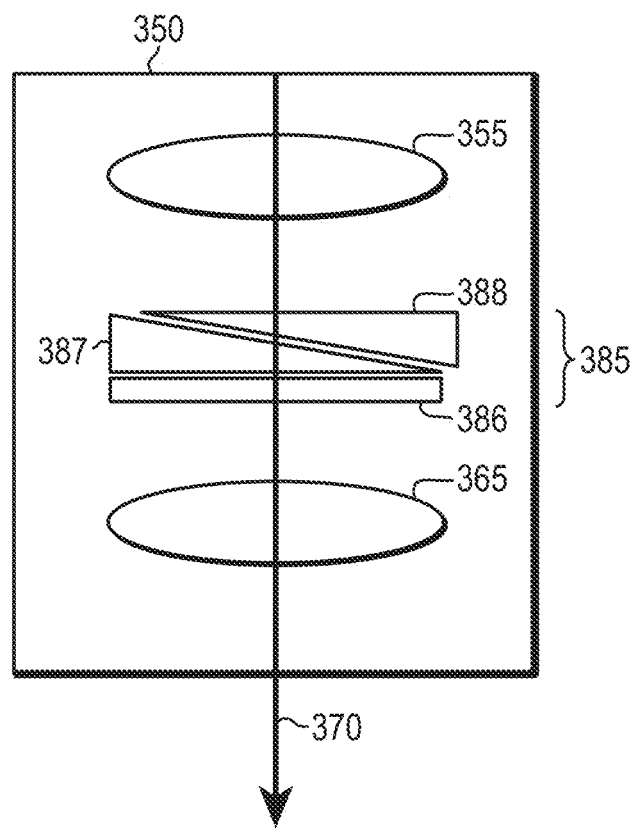
Figure 3E:
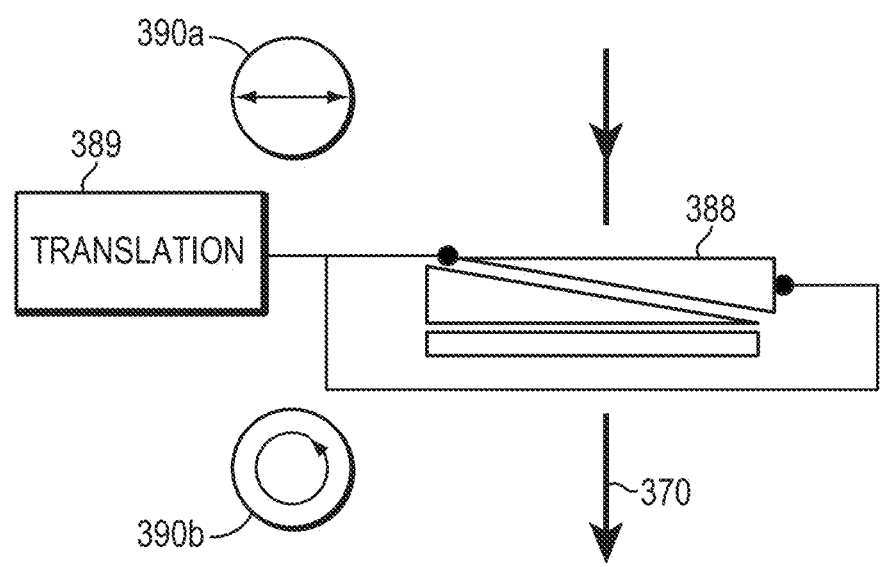

In one embodiment shown in FIGS. 3D and 3E, polarization adjustment is also accomplished within a laser head component 350. The laser head 350 includes collimating lens 355 and focusing lens 365 to direct beam 370 onto the surface of the workpiece, just as the laser head 350 depicted in FIG. 3B. In the embodiment of FIG. 3D, the laser head 350 includes a Babinet-Soleil compensator 385 between the collimating lens 355 and the focusing lens 365. As known in the art, Babinet-Soleil compensator 385 is a continuously variable optical retarder capable of altering the polarization of light traveling therethrough from linear to circular and any elliptical polarization state therebetween. In various embodiments, the Babinet-Soleil compensator 385 includes or consists essentially of a compensator plate 386, a fixed birefringent wedge 387, and a movable birefringent wedge 388. The long axis of the compensator plate 386 is typically perpendicular to the long axes of the wedges 387, 388. Movement of the wedge 388 relative to the plate 386 and the wedge 377 alters the polarization state of the beam 370 to any elliptical state between linear and circular. With reference to FIGS. 3A, 3D, and 3E, a conventional electro-mechanical translation device 389 translates the movable wedge 388 of the Babinet-Soleil compensator 385 under the control of the controller 310 as the beam moves through the processing path 102 (e.g., as the thickness of the workpiece changes), thereby changing the polarization state as a function of the thickness of the workpiece along the path 102.

For example, the circularity (i.e., the transition from linear to elliptical or circular) of the polarization state of the beam 370 may be increased as the thickness of the workpiece increases. The polarization of the beam 370 is shown at a first state 390a prior to encountering the Babinet-Soleil compensator 385 and at a second state 390b after passing through the Babinet-Soleil compensator 385.

Figure 3F:
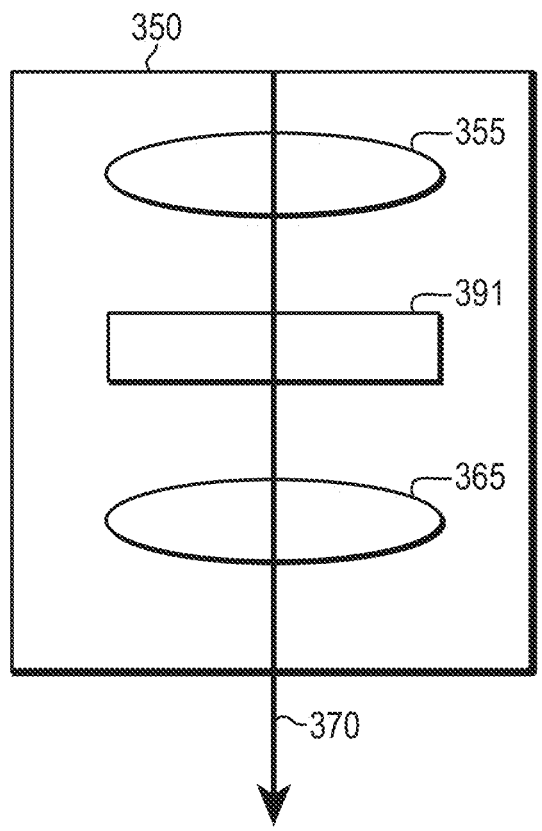
Figure 3G:
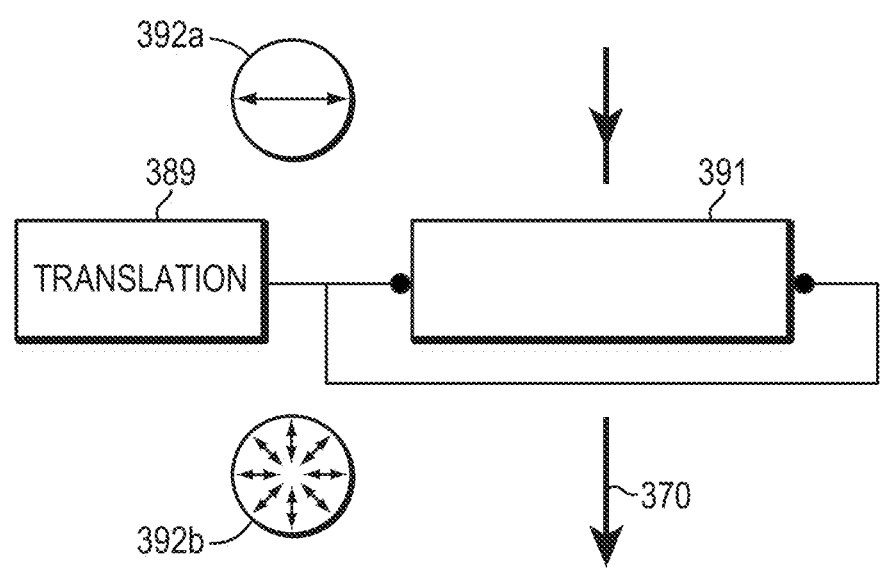

In another embodiment shown in FIGS. 3F and 3G, polarization adjustment is also accomplished within a laser head component 350. The laser head 350 includes collimating lens 355 and focusing lens 365 to direct beam 370 onto the surface of the workpiece, just as the laser head 350 depicted in FIGS. 3B and 3D. In the embodiment of FIG. 3F, the laser head 350 includes a radial polarization converter 391 between the collimating lens 355 and the focusing lens 365. As known in the art, a radial polarization converter 391 may include, consist essentially of, or consist of a glass wave plate that converts linear polarization to radial polarization or azimuthal polarization. For example, the radial polarization converter 391 may be a half-wave plate with a continuously varying slow axis direction or a space variant quarter-wave plate possessing radial symmetry. The radial polarization converter 391 may include, consist essentially of, or consist of a glass plate having thereon a nanostructured grating, e.g., the S-waveplate Radial Polarization Converter available from UAB Altechna of Vilnius, Lithuania, or one of the Radial Polarization Converters available from Edmund Optics Inc. of Barrington, N.J. In other embodiments, the radial polarization converter 391 may include, consist essentially of, or consist of a liquid crystal in which the liquid crystal molecules are specifically aligned to produce the desired radial or azimuthal polarization, e.g., the Arcopix Radial Polarization converter available from Arcopix of Neuchatel, Switzerland. Movement of the radial polarization converter 391 within the path of beam 370 alters the polarization state of the beam 370 from linear to radial or azimuthal or vice versa. In various embodiments, beam 370 that is radially polarized is focusable to a smaller spot size than beam 370 having a linear polarization. With reference to FIGS. 3A, 3F, and 3G, a conventional electro-mechanical translation device 389 translates radial polarization converter 391 under the control of the controller 310 as the beam moves through the processing path 102, thereby changing the polarization state along the path 102. The polarization of the beam 370 is shown at a first state 392a prior to encountering the radial polarization converter 391 (i.e., linear polarization) and at a second state 392b after passing through the radial polarization converter 391 (i.e., radial polarization).

Figure 4A:
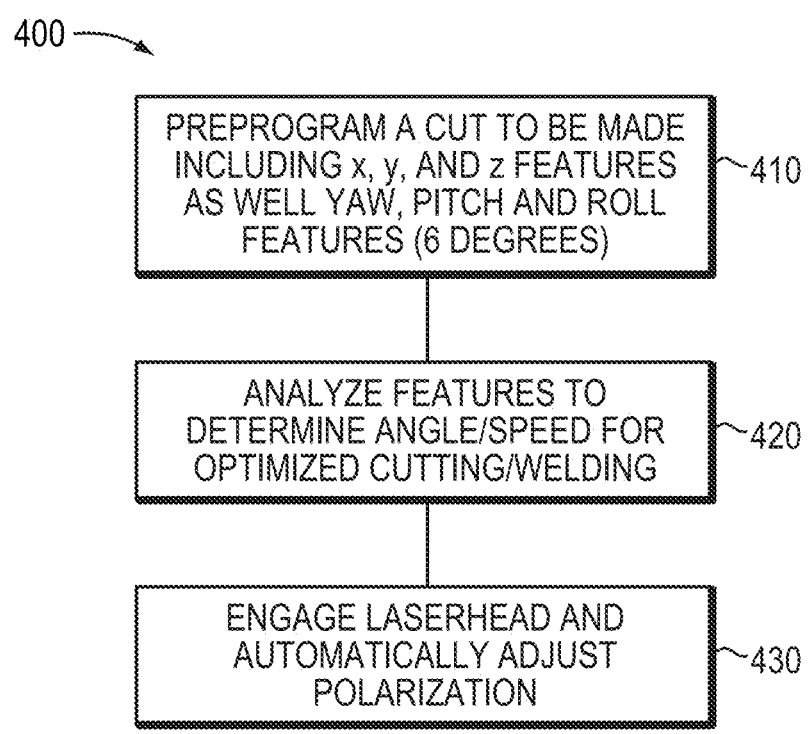
FIG. 4A illustrates a method for cutting or welding a material using an automatically adjusting polarization beam in accordance with various embodiments of the invention.

FIG. 4A illustrates a representative method 400 of operating the system 300 to perform a cutting operation. In a first step 410, the user preprograms the desired path into the system 300 using any suitable input device or by means of file transfer. In step 420, the controller 310 analyzes the curves, features (e.g., thickness), and cutting direction of the path, queries the database 330 as necessary, determines how fast the cut can be made, and determines the optimal polarization direction and/or state of the laser beam relative to the cutting direction. In operation, indicated at step 430, the controller 330 operates the laser 305 and subsystems 315, 320 to cut along the preprogrammed path, maintaining the proper polarization. If the composition and/or thickness of the material being processed changes, the location and nature of the change may be programmed, and the controller 310 can adjust the laser beam parameters (including polarization) accordingly. It should be noted that the optimal cutting, welding or manufacturing solution may not necessarily be the cleanest cut or weld, because additional steps in the process are typically needed regardless. Thus overall optimization may be based on the desired output, and the present methods and systems are configured to produce those desired results whatever they may be. As noted earlier, cutting is only one example of laser processing that may benefit from the approach of the present invention.

The controller 310 may be provided as either software, hardware, or some combination thereof. For example, the system may be implemented on one or more conventional server-class computers, such as a PC having a CPU board containing one or more processors such as the Pentium or Celeron family of processors manufactured by Intel Corporation of Santa Clara, Calif., the 680x0 and POWER PC family of processors manufactured by Motorola Corporation of Schaumburg, Ill., and/or the ATHLON line of processors manufactured by Advanced Micro Devices, Inc., of Sunnyvale, Calif. The processor may also include a main memory unit for storing programs and/or data relating to the methods described above. The memory may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), programmable logic devices (PLD), or read-only memory devices (ROM). In some embodiments, the programs may be provided using external RAM and/or ROM such as optical disks, magnetic disks, as well as other commonly used storage devices. For embodiments in which the functions are provided as one or more software programs, the programs may be written in any of a number of high level languages such as FORTRAN, PASCAL, JAVA, C, C++, C #, BASIC, various scripting languages, and/or HTML. Additionally, the software may be implemented in an assembly language directed to the microprocessor resident on a target computer; for example, the software may be implemented in Intel 80x86 assembly language if it is configured to run on an IBM PC or PC clone. The software may be embodied on an article of manufacture including, but not limited to, a floppy disk, a jump drive, a hard disk, an optical disk, a magnetic tape, a PROM, an EPROM, EEPROM, field-programmable gate array, or CD-ROM.

Although the methods described herein for improving processing work well for linearly polarized beams (delivered via a free-space laser or polarization-maintaining fiber), the techniques also work with elliptically polarized beams (dominated by one polarization) as well. For example, a beam from a standard multimode fiber would be likely elliptically polarized and could benefit from the approaches described herein.

Figure 4B:
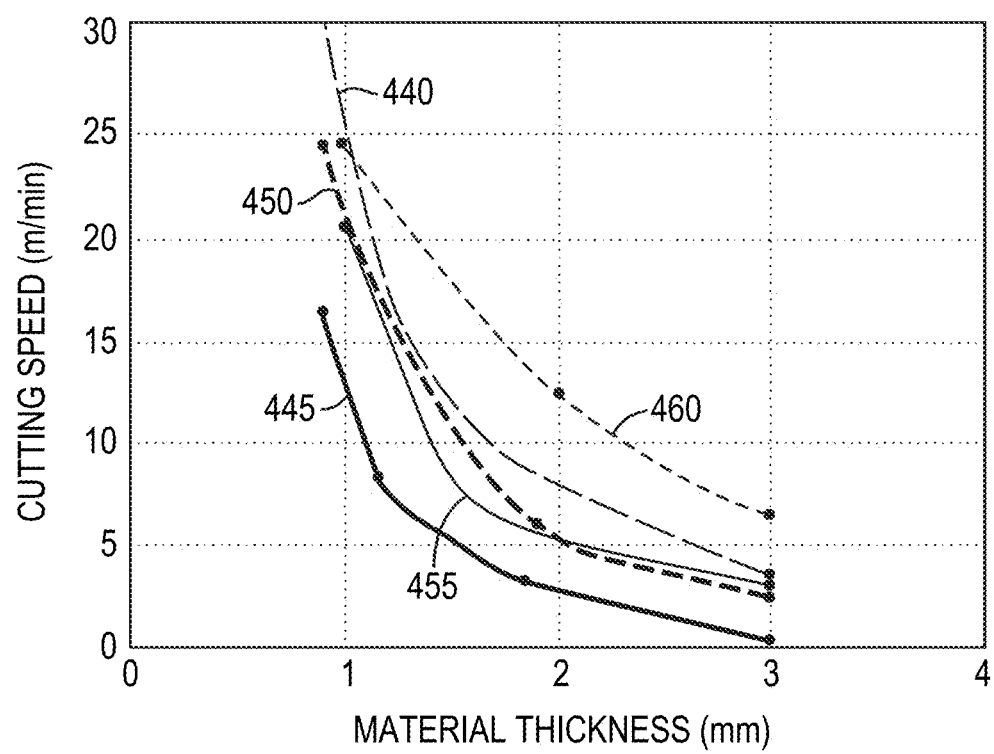
FIGS. 4B-4D are graphs of cutting speed as a function of workpiece thickness, comparing laser beams with controlled polarization in accordance with various embodiments of the invention with conventional unpolarized beams.

Embodiments of the invention may be advantageously utilized for more efficient cutting of various materials, e.g., metallic materials. FIG. 4B is a graph of achievable cutting speed as a function of workpiece thickness for a workpiece composed of 304 stainless steel under a flow of nitrogen gas. Four different laser systems were utilized for the cutting. First, a laser system in accordance with embodiments of the invention operating at 1 kW of power and utilizing a 58 µm polarization-maintaining optical output fiber to produce a linearly polarized laser output beam was utilized to cut the workpiece in directions parallel and perpendicular to the polarization direction. Trend line 440 depicts the cutting speed achievable for the beam polarized parallel to the cutting direction, and trend line 445 depicts the cutting speed achievable for the beam polarized perpendicular to the cutting direction. As shown, the parallel polarized beam is capable of cutting speeds vastly higher than the perpendicular polarized beam, particularly for thinner workpieces. Trend lines 450 and 455 depict the data for two different commercially available 1 kW laser systems having unpolarized output beams (i.e., utilizing output fiber optic cables that are not polarization-maintaining fibers). As shown, the unpolarized beam is capable of faster cutting compared with the perpendicular polarized beam of trend line 445 but is slower compared to the parallel polarized beam of trend line 440. Trend line 460 depicts data for a 2 kW laser having a 100 µm output fiber but that also produces an unpolarized beam. As would be expected, this more powerful laser system is capable of faster cutting speeds than the lower-power laser systems, although that advantage diminishes and even disappears for thinner workpieces, which the parallel polarized beam of trend line 440 cuts at higher speed despite operating at lower power and with a smaller output fiber.

Figure 4C:
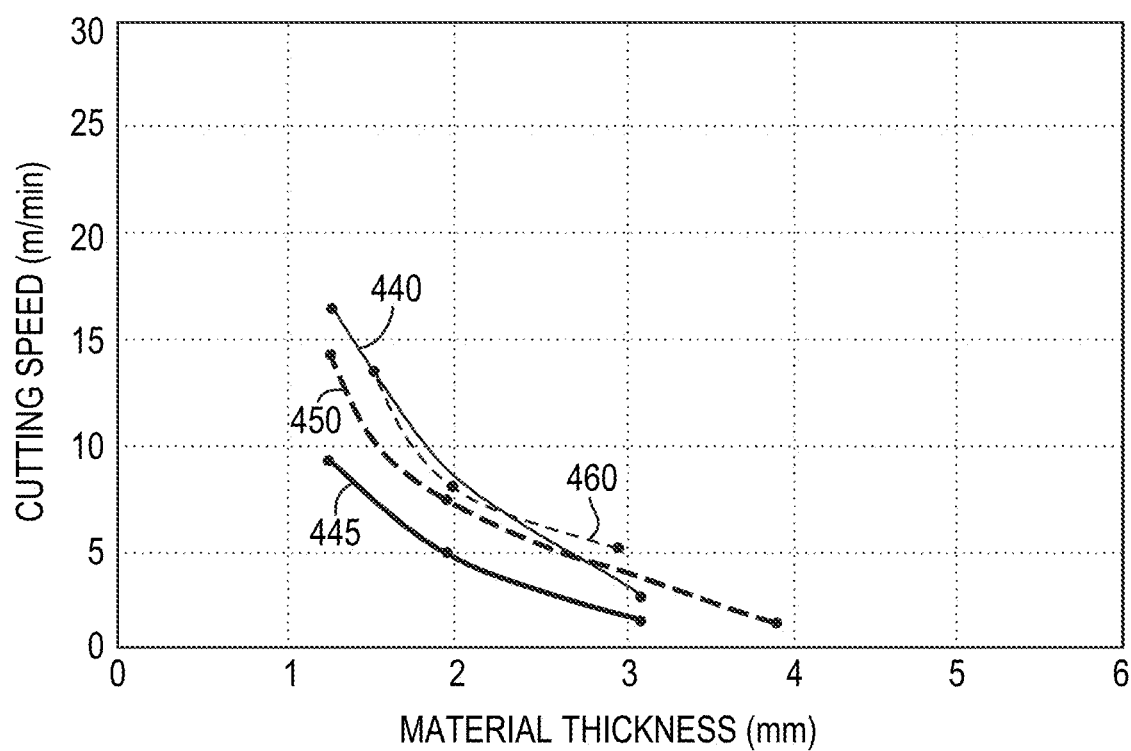

FIG. 4C is a graph of achievable cutting speed as a function of workpiece thickness for a workpiece composed of 3003 aluminum under a flow of nitrogen gas. The laser systems utilized are the same as those described above for FIG. 4B. As shown, the parallel polarized beam represented by trend line 440 exhibits the best cutting performance, and the performance of the parallel polarized beam is even superior to that of the 2 kW, 100 µm unpolarized beam of trend line 460, particularly for thinner workpiece thicknesses. As in FIG. 4B, the perpendicular polarized beam of trend line 445 depicts the worst performance, emphasizing an advantageous effect of embodiments of the invention in which polarization direction is maintained parallel to the cutting direction.

Figure 4D:
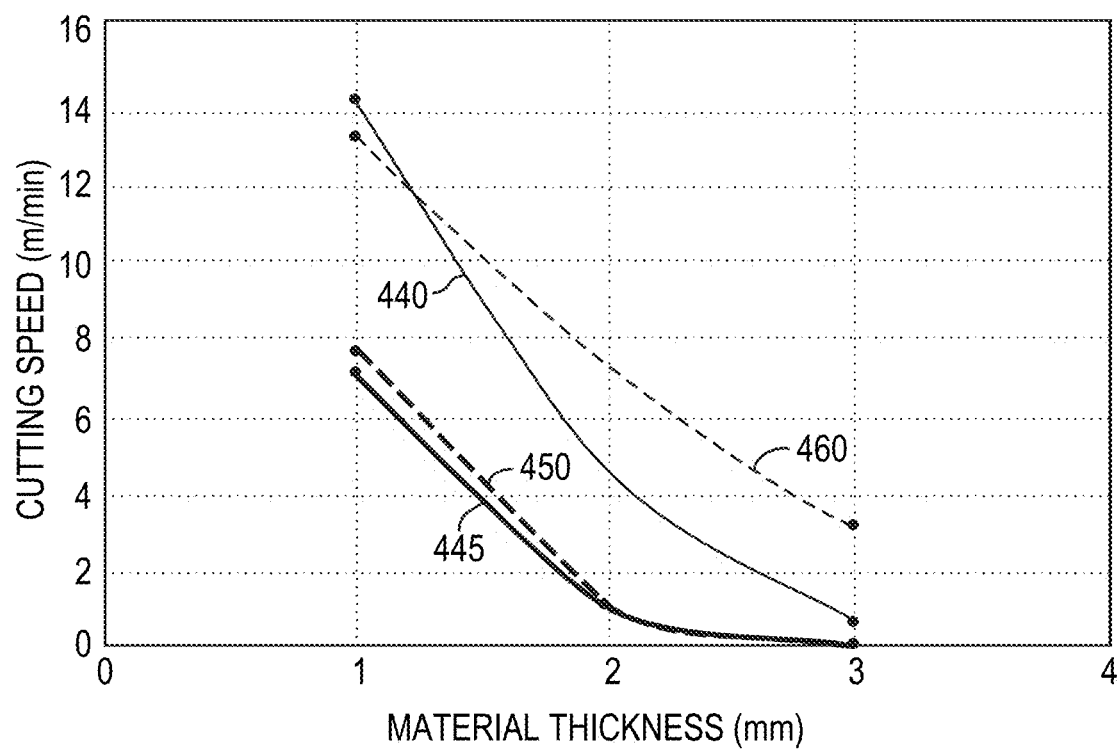

FIG. 4D is a graph of achievable cutting speed as a function of workpiece thickness for a workpiece composed of brass under a flow of nitrogen gas. The laser systems utilized are the same as those described above for FIG. 4B. As shown, the parallel polarized beam represented by trend line 440 exhibits fast cutting performance, particularly for thinner workpiece thicknesses. The parallel polarized beam represented by trend line 440 also exhibits much faster cutting speed than the comparable 1 kW unpolarized beam represented by trend line 450. As in FIGS. 4B and 4C, the perpendicular polarized beam of trend line 445 depicts the worst performance, and in fact was incapable of appreciable cutting speeds for the workpiece having a thickness of 3 mm.

Figure 5:
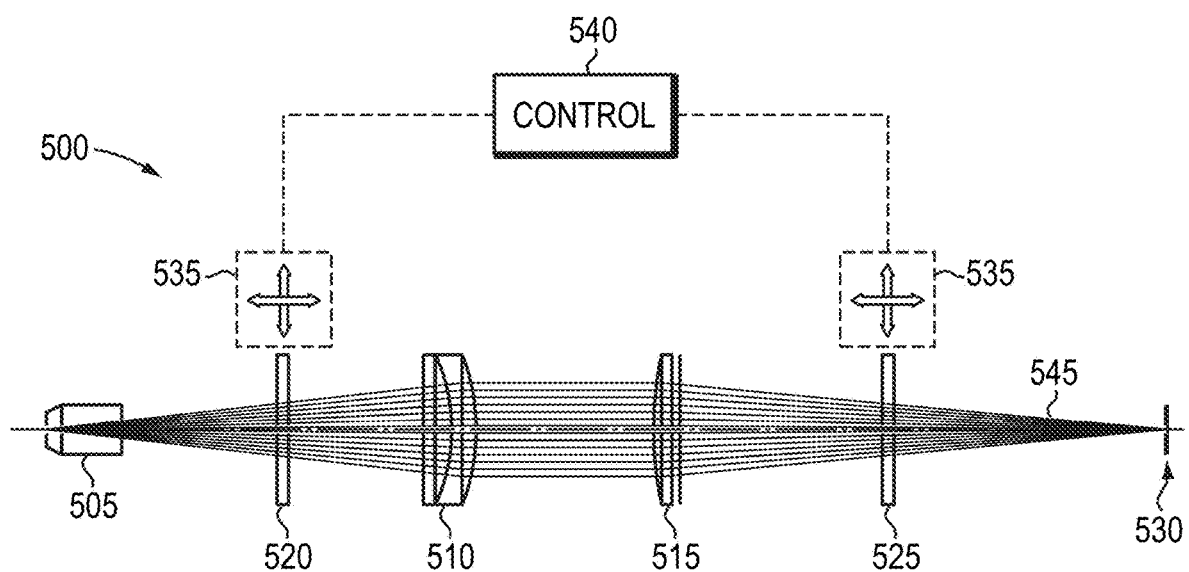
FIG. 5 is a schematic diagram of a laser beam delivery system in accordance with various embodiments of the invention.

Embodiments of the present invention combine polarization adjustments of a beam in response to workpiece material and/or physical properties with techniques for shaping the beam and/or adjusting the BPP of the beam. FIG. 5 depicts a schematic diagram of a laser beam delivery system 500 incorporating beam-manipulating optical elements in accordance with embodiments of the present invention. In various embodiments, the laser beam delivery system 500 may be disposed within, for example, a laser-based cutting head or welding head (e.g. cutting head 350) and may be combined with various components therein (e.g., optical elements, controllers, etc.) utilized to adjust the polarization of the output beam. The beam delivery system 500 may feature a beam delivery fiber, terminating in a fiber end cap 505, that is connected to remaining portions of the laser-generating system (for example, a WBC laser system, not shown in FIG. 5), a collimating lens 510, a focusing lens 515, and an optical element 520 that is positioned between the end cap 505 and the collimating lens 510. In various embodiments of the invention featuring combined functionality for beam shaping and polarization adjustment, elements such as collimating lens 510 and focusing lens 515 may be shared between those functionalities, i.e., the laser beam delivery system in various embodiments may have various optical elements that facilitate both beam shaping and polarization adjustment. In various embodiments, the optical element 520 is disposed close to the fiber end cap 505 to minimize the size of the beam striking the optical element 520. Refraction of a smaller beam may be performed with optics having smaller geometric dimensions of the optics and may vary the output profile with more sensitivity. FIG. 5 also depicts an optional second optical element 525 disposed between the focusing lens 515 and a workpiece 530. The workpiece 530 may include or consist essentially of, for example, one or more parts (e.g., metallic parts) to be welded, drilled, and/or cut by the beam focused by focusing lens 515. In various embodiments, the first optical element 520 is disposed between the focusing lens 515 and the workpiece 530 and the second optical element 525 is omitted. Optical elements 520, 525 may each include or consist essentially of, for example, a phase plate.

The positions of first optical element 520 and/or second optical element 525 may be translated within the beam profile via use of a lens manipulation system that may include or consist essentially of, for example, one or more mechanized or motorized translation stages 535 capable of motion along two or three axes. The lens manipulation system may be responsive to a controller 540. The controller 540 may be responsive to a desired target radiation power distribution and/or BPP or other measure of beam quality (e.g., input by a user and/or based on one or more properties of a workpiece to be processed such as the distance to the workpiece, the composition of the workpiece, topography of the workpiece, thickness of the workpiece, etc.) and configured to position optical element 520 and/or optical element 525 to cause the manipulated beam 545 to strike the workpiece 530 with the target radiation power distribution or beam quality. The controller 540 may be programmed to achieve the desired power distribution and/or output BPP and/or beam quality via a particular optical element positioning as detailed herein. The controller 540 may be provided as either software, hardware, or some combination thereof. For example, the system may be implemented on one or more conventional server-class computers, such as a PC having a CPU board containing one or more processors such as the Pentium or Celeron family of processors manufactured by Intel Corporation of Santa Clara, Calif., the 680x0 and POWER PC family of processors manufactured by Motorola Corporation of Schaumburg, Ill., and/or the ATHLON line of processors manufactured by Advanced Micro Devices, Inc., of Sunnyvale, Calif. The processor may also include a main memory unit for storing programs and/or data relating to the methods described herein. The memory may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), programmable logic devices (PLD), or read-only memory devices (ROM). In some embodiments, the programs may be provided using external RAM and/or ROM such as optical disks, magnetic disks, as well as other commonly used storage devices. For embodiments in which the functions are provided as one or more software programs, the programs may be written in any of a number of high level languages such as FORTRAN, PASCAL, JAVA, C, C++, C #, BASIC, various scripting languages, and/or HTML. Additionally, the software may be implemented in an assembly language directed to the microprocessor resident on a target computer; for example, the software may be implemented in Intel 80x86 assembly language if it is configured to run on an IBM PC or PC clone. The software may be embodied on an article of manufacture including, but not limited to, a floppy disk, a jump drive, a hard disk, an optical disk, a magnetic tape, a PROM, an EPROM, EEPROM, field-programmable gate array, or CD-ROM.

Figure 6:
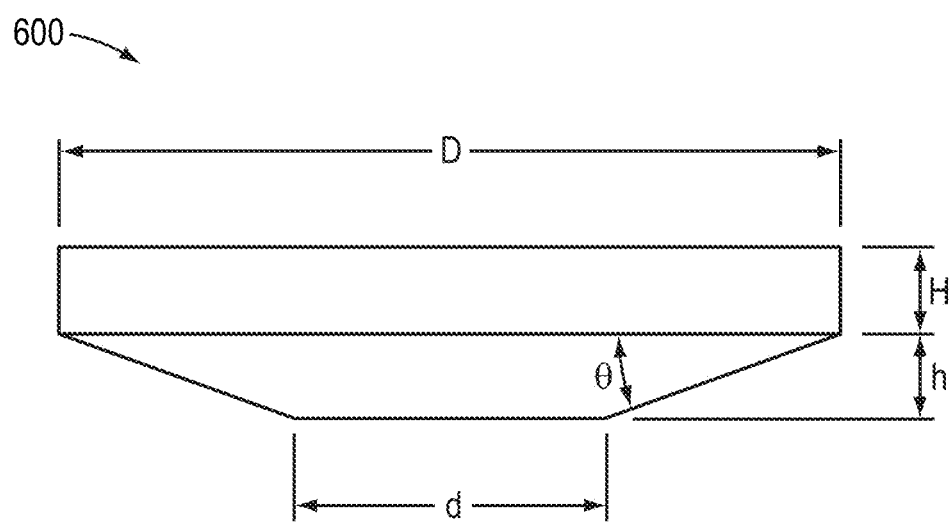
FIG. 6 is a schematic diagram of a flat-top cone optical element in accordance with various embodiments of the invention.

FIG. 6 is a schematic diagram of an optical element 600 having the shape of a truncated cone (flat-top cone shape or tapered cylinder shape) in accordance with embodiments of the invention. For example, optical element 600 may be utilized as optical element 520 and/or optical element 525 in delivery system 500. The parameters D, d, θ, and H are geometrical design parameters for outside diameter, inside diameter (which may correspond to the beam size of the beam when it strikes the optical element), slope angle which defines the maximum sagitta (or "sag," h) and the separation of outer ring of the beam from the spot center of the beam, and the thickness of the optical element 600, respectively. Ray tracing of geometric optics may be used to design optical elements in accordance with embodiments of the present invention based on the conservation of energy, the constancy of optical path length and Snell's law. The lens design and its surface profiles may, for example, transform the beam profile from a Gaussian into a Bessel laser beam with a desired intensity distribution.

Table 1 provides exemplary design values for exemplary optical elements 600 including, consisting essentially of, or consisting of two different materials, fused silica and zinc sulfide (e.g., ZnS MultiSpectral, available from II-VI Inc. of Saxonburg, Pa.).

TABLE 1

| Optical Element Material | Fused Silica | Zinc Sulfide |
|---|---|---|
| D (mm) | 25 | 25 |
| d (mm) | 8 | 8 |
| H (mm) | 2 | 0.85 |
| h (μm) | 50 | 17 |
| Θ (mrad) | 5.9 | 2 |

Figure 7A:
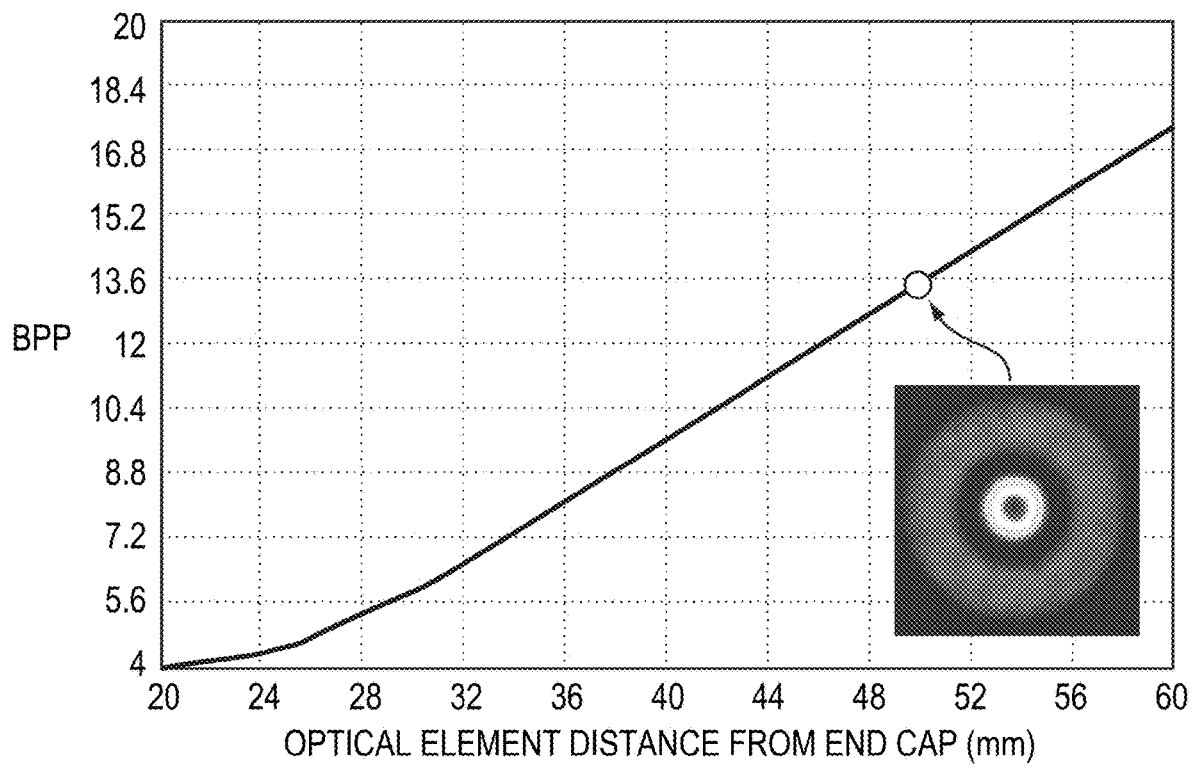
FIG. 7A is a graph of BPP variation as a function of the distance of a fused silica flat-top cone optical element from a beam source in accordance with various embodiments of the invention.
Figure 7B:
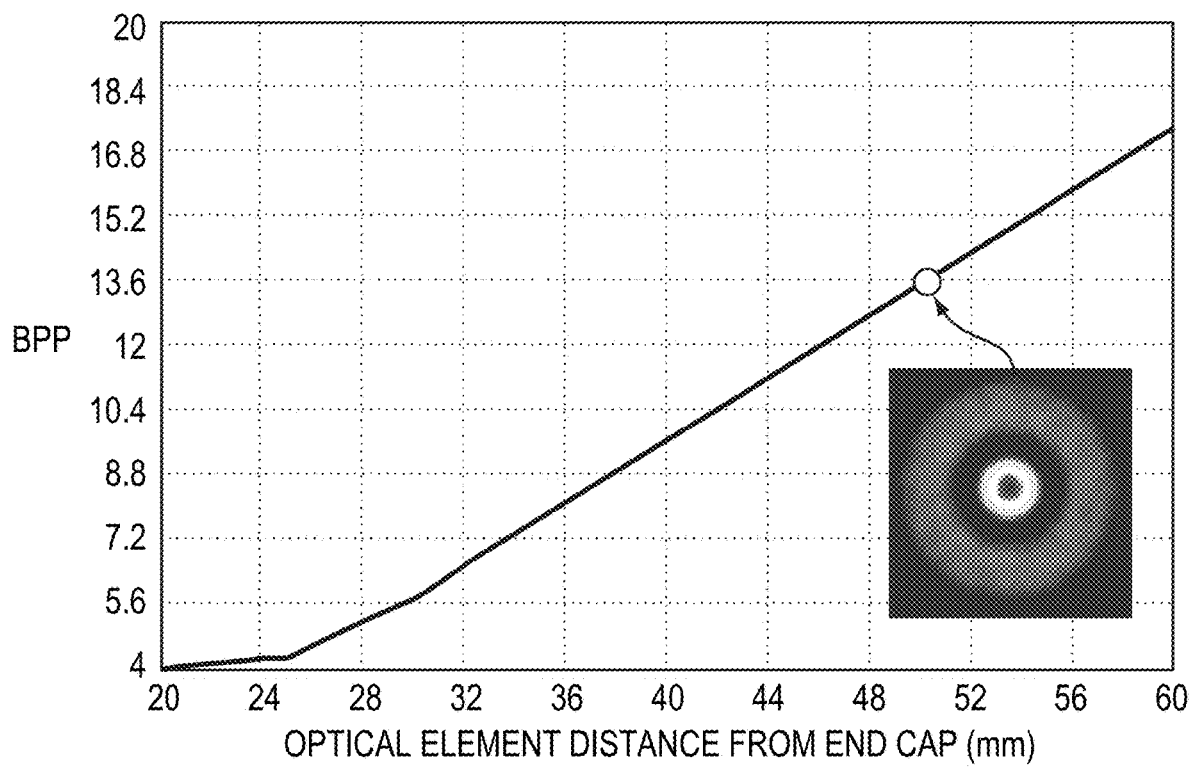
FIG. 7B is a graph of BPP variation as a function of the distance of a zinc sulfide flat-top cone optical element from a beam source in accordance with various embodiments of the invention.

FIGS. 7A and 7B are graphs of BPP at different distances from the fiber end cap 505 to the exemplary fused silica (FIG. 7A) and zinc sulfide (FIG. 7B) optical elements 600 having the design parameters provided in Table 1. In the plots, the initial position of the optical element 600 is assumed to be 25 mm from the end cap 505. As shown, in both cases, the BPP of the beam may be increased from about 4 to about 12 via displacement of the optical element 600 by approximately 30 mm. The slope of this change in BPP as a function of displacement may be altered via changes in the numerical aperture of the fiber output at the end cap 505. The beam profiles at a 50 mm distance of the optical element 600 to the fiber end cap 505 are also shown in FIGS. 7A and 7B.

Figure 8A:
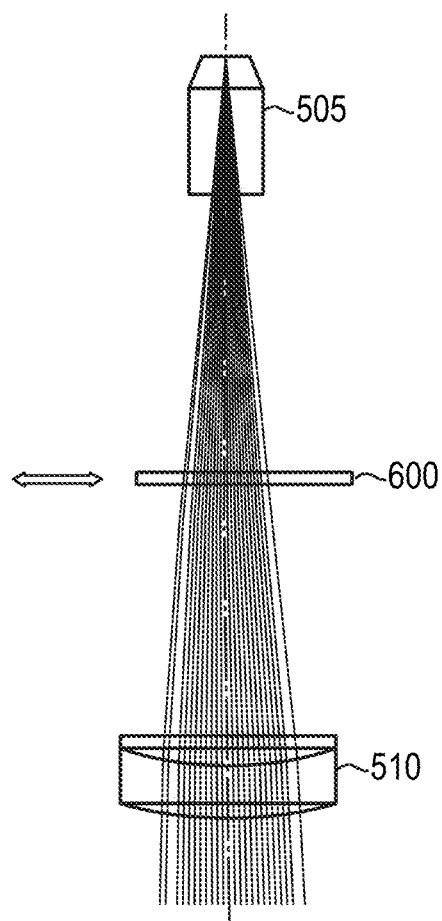
FIG. 8A is a schematic diagram of a laser delivery system having an off-center optical element in accordance with various embodiments of the invention.
Figures 8B, 8C, 8D:
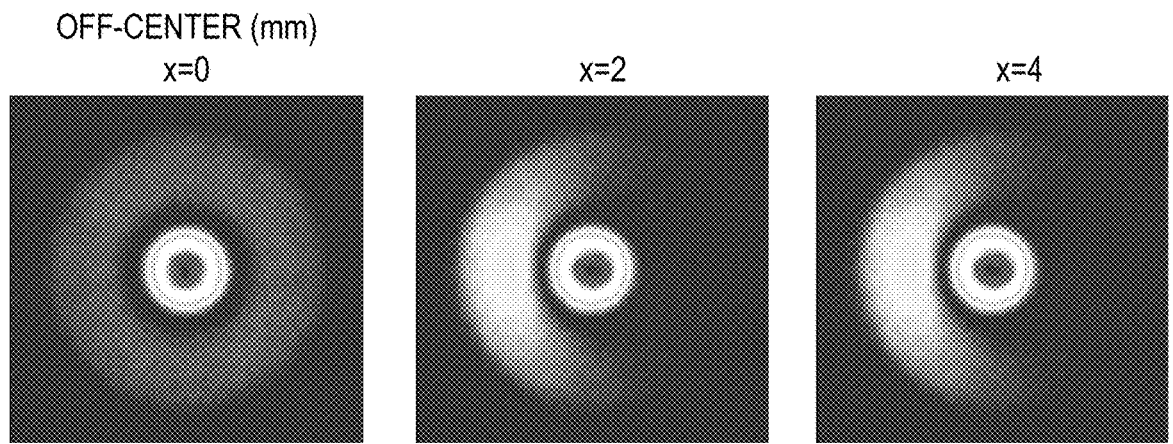
FIGS. 8B-8D depict beam profiles as a function of off-center distance produced by the laser delivery system of FIG. 8A.
Figure 8E:
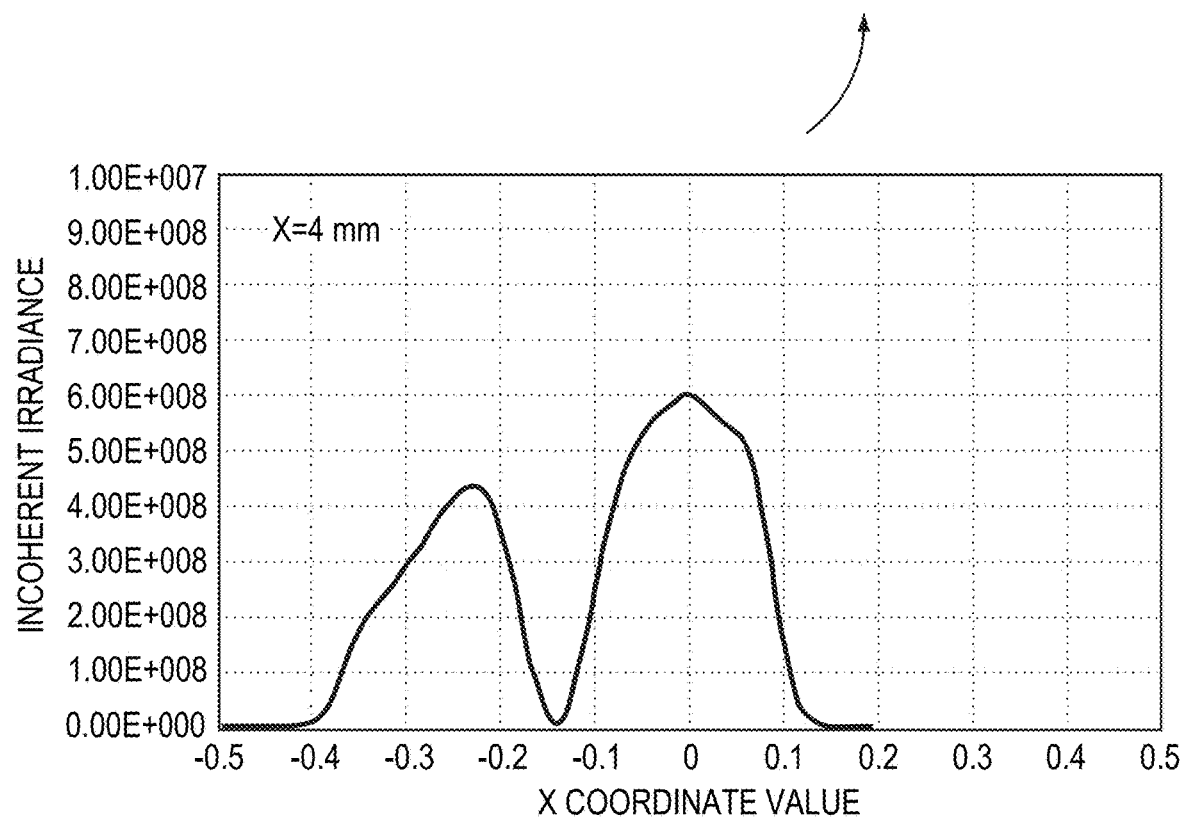
FIG. 8E is a graph of irradiance as a function of position for the two-peak beam profile depicted in FIG. 4D.

A tailored beam profile that has two peaks in one axis may be obtained by positioning the optical element 600 (or other optical elements detailed herein) transversely off-center in the beam path (i.e., partially introducing it into the input laser beam) as shown in FIG. 8A. Depending on the degree of introduction, the beam profile of the output laser beam may be optimally adapted to a variety of laser applications. In FIGS. 8B-8D, the beam profiles at different off-centered distances (0 mm, 2 mm, and 4 mm) for optical element 600 at a 40 mm distance to the end cap 505 are shown. FIG. 8E is a graph of irradiance as a function of position for the beam profile depicted in FIG. 8D, clearly showing the two-peak nature of the beam profile. In various embodiments, the variation of BPP at different off-centered positions of the optical element 600 is approximately zero, even while the irradiance as a function of position across the beam profile changes.

Figure 9:
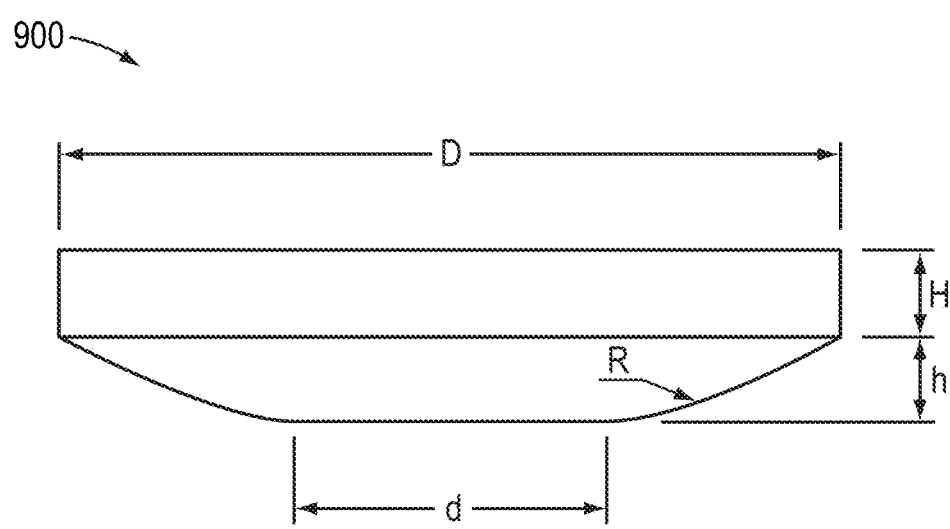
FIG. 9 is a schematic diagram of a flat-top spherical optical element in accordance with various embodiments of the invention.

Optical elements in accordance with embodiments of the invention may also have a truncated spherical (i.e., flat-top spherical) configuration and may be used to also produce a Bessel beam profile. The geometric design for optical elements 900 in accordance with such embodiments is depicted schematically in FIG. 9. Optical element 900 may be utilized as optical element 520 and/or optical element 525 in delivery system 500. The design parameters are the same as those detailed above for the flat-top cone optical element 600 except for the curvature radius R, which also defines the maximum sag (h) and the separation of the resulting annular beam ring from the beam spot center.

Table 2 provides exemplary design values for exemplary optical elements 900 including, consisting essentially of, or consisting of two different materials, fused silica and zinc sulfide.

TABLE 2

| Optical Element Material | Fused Silica | Zinc Sulfide |
|---|---|---|
| D (mm) | 25 | 25 |
| d (mm) | 8 | 8 |
| H (mm) | 2 | 0.85 |
| h (μm) | 58 | 23 |
| R (mm) | 1200 | 3000 |

Figure 10A:
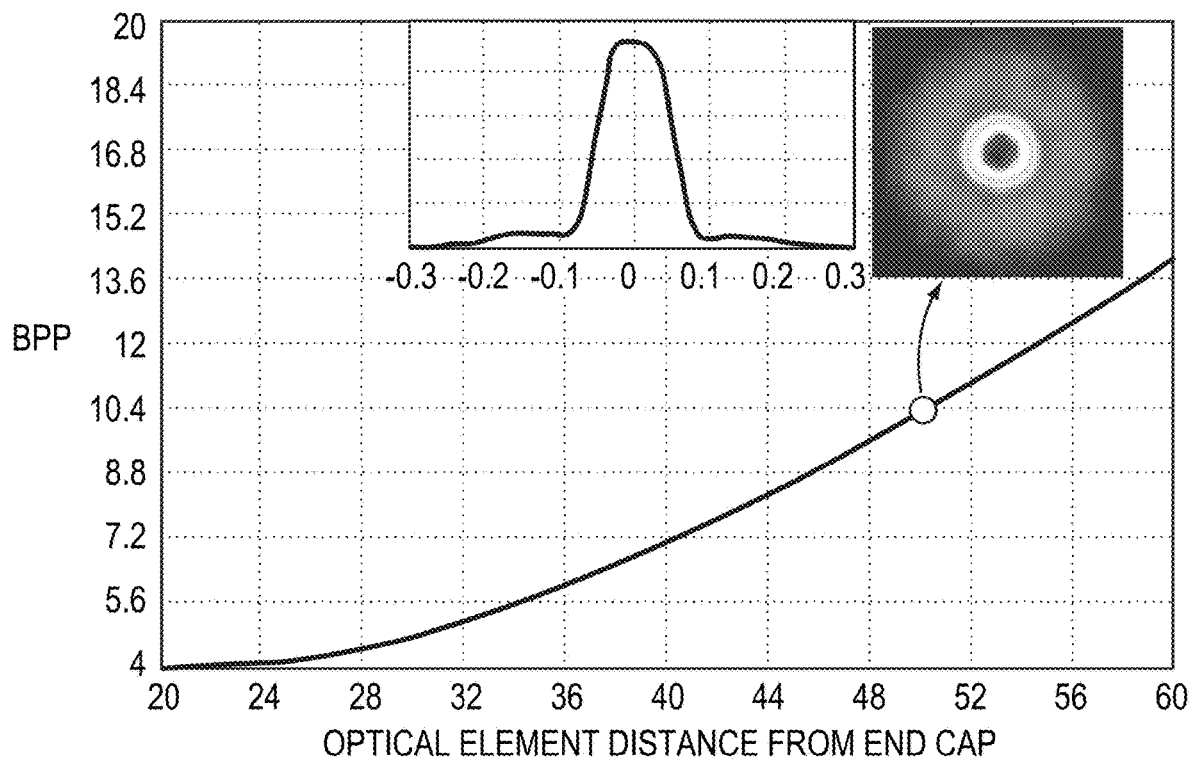
FIG. 10A is a graph of BPP variation as a function of the distance of a fused silica flat-top spherical optical element from a beam source in accordance with various embodiments of the invention.
Figure 10B:
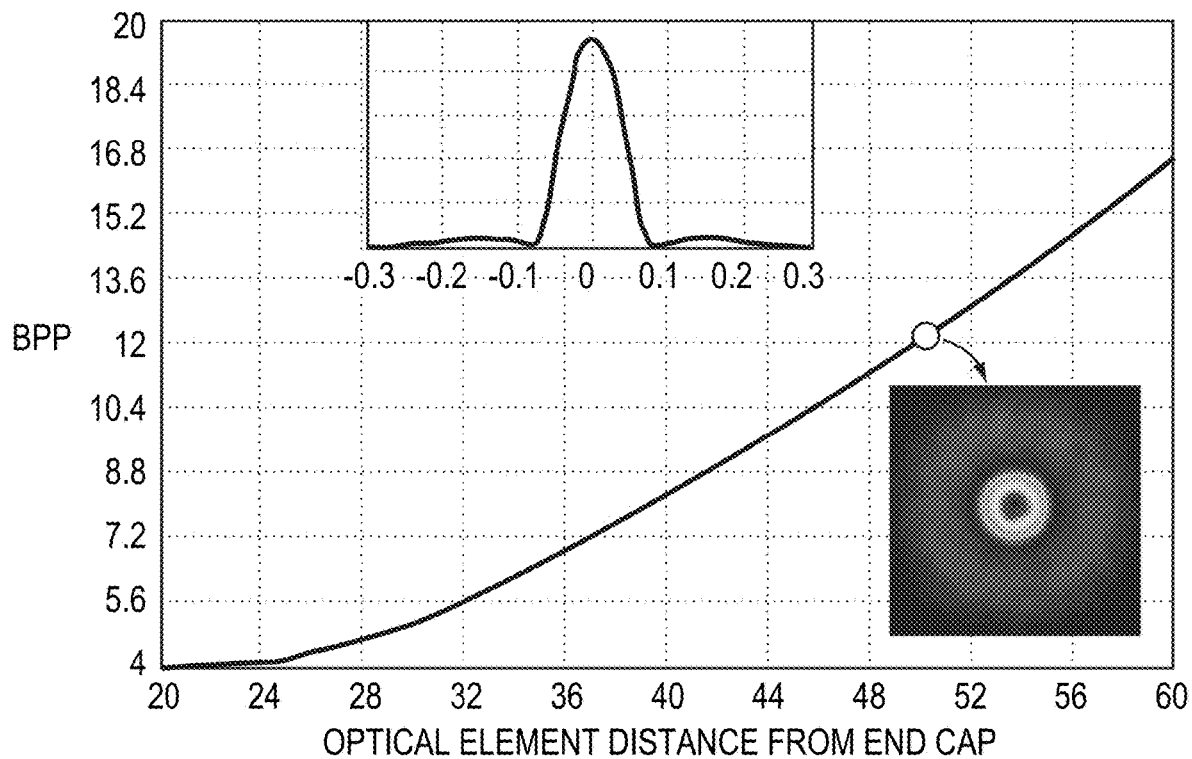
FIG. 10B is a graph of BPP variation as a function of the distance of a zinc sulfide flat-top spherical optical element from a beam source in accordance with various embodiments of the invention.

FIGS. 10A and 10B are graphs of BPP at different distances from the fiber end cap 505 to the exemplary fused silica (FIG. 10A) and zinc sulfide (FIG. 10B) optical elements 900 having the design parameters provided in Table 2. In the plots, the initial position of the optical element 900 is assumed to be 25 mm from the end cap 505. As shown, in both cases, the BPP of the beam may be increased from about 4 to about 12 via displacement of the optical element 900 by approximately 30 mm (e.g., approximately 28 mm-approximately 32 mm). The slope of this change in BPP as a function of displacement may be altered via changes in the numerical aperture of the fiber output at the end cap 505. The beam profiles at a 50 mm distance of the optical elements 900 to the fiber end cap 505 are also shown in FIGS. 10A and 10B, as are graphs of their irradiance as a function of position for the 50 mm spacing between optical element 900 and end cap 505.

Figures 11A, 11B, 11C:
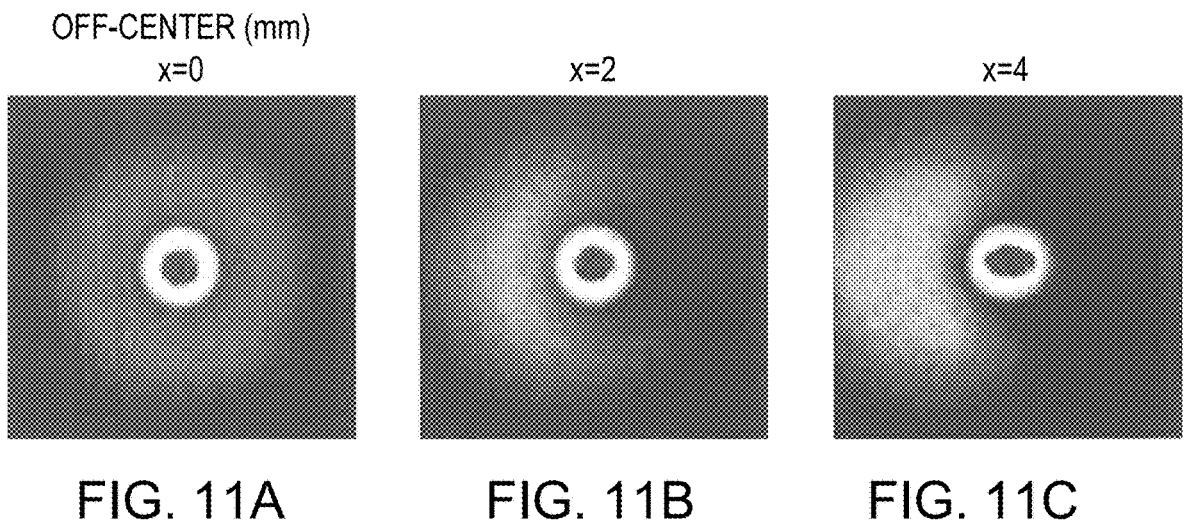
FIGS. 11A-11C depict beam profiles as a function of off-center distance produced by a laser delivery system incorporating the optical element of FIG. 9 in accordance with various embodiments of the invention.
Figure 11D:
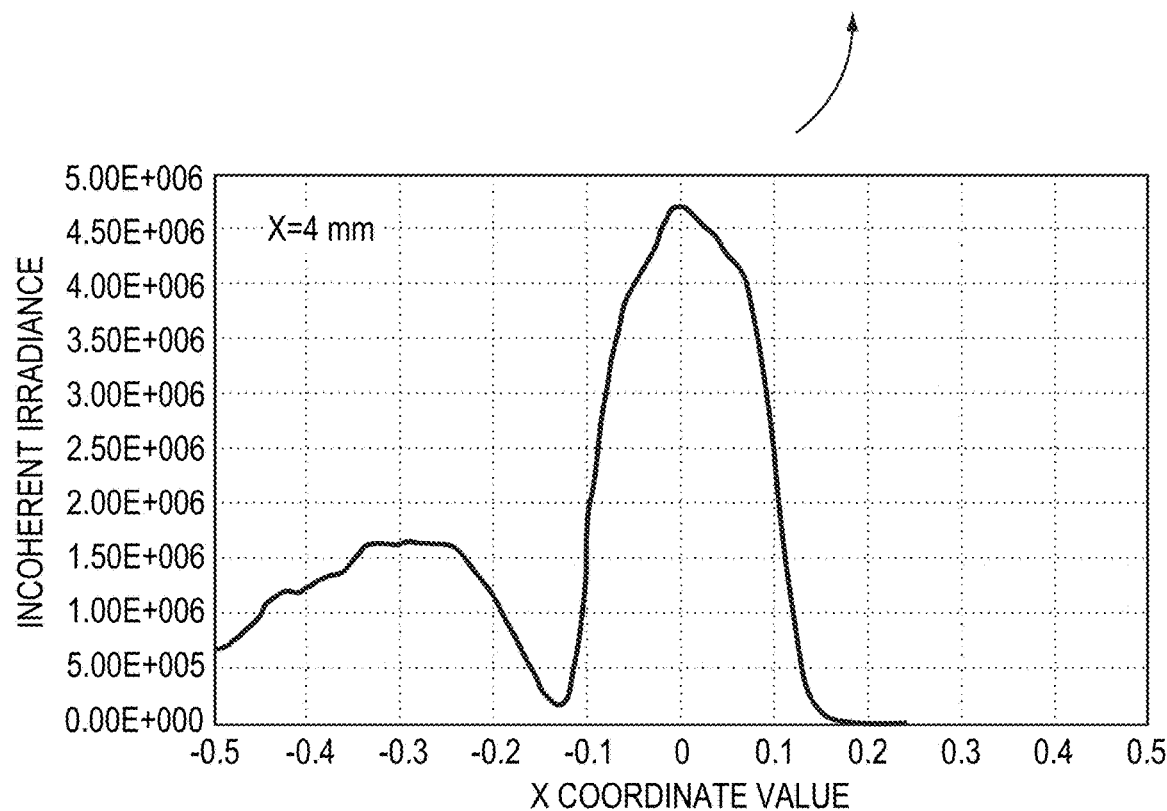
FIG. 11D is a graph of irradiance as a function of position for the two-peak beam profile depicted in FIG. 11C.

In FIGS. 11A-11C, the beam profiles at different off-centered distances (0 mm, 2 mm, and 4 mm) for optical element 900 (i.e., as shown for optical element 600 in FIG. 6A) at a 40 mm distance to the end cap 505 are shown. FIG. 11D is a graph of irradiance as a function of position for the beam profile depicted in FIG. 11C, clearly showing the two-peak nature of the intensity of the beam profile. In various embodiments, the variation of BPP at different off-centered positions of the optical element 900 is approximately zero, even while the irradiance as a function of position across the beam profile changes.

Figure 12A:
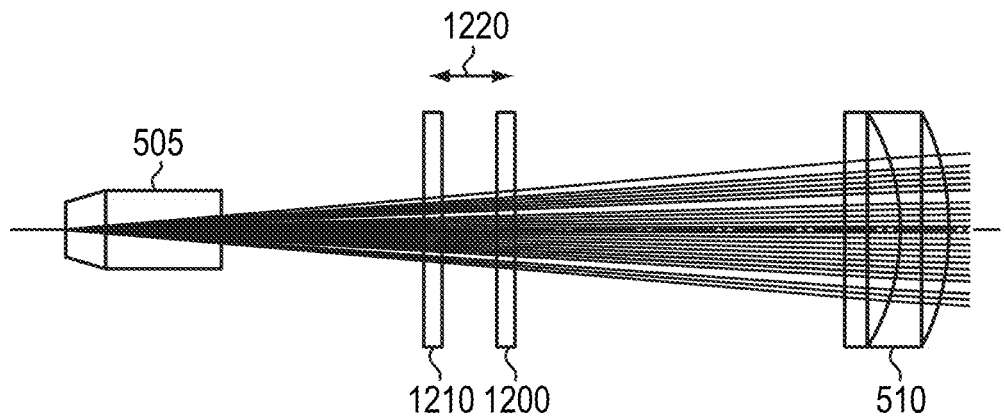
FIG. 12A is a schematic diagram of a portion of a laser delivery system having two axicon-lens optical elements in accordance with various embodiments of the invention.
Figure 12B:
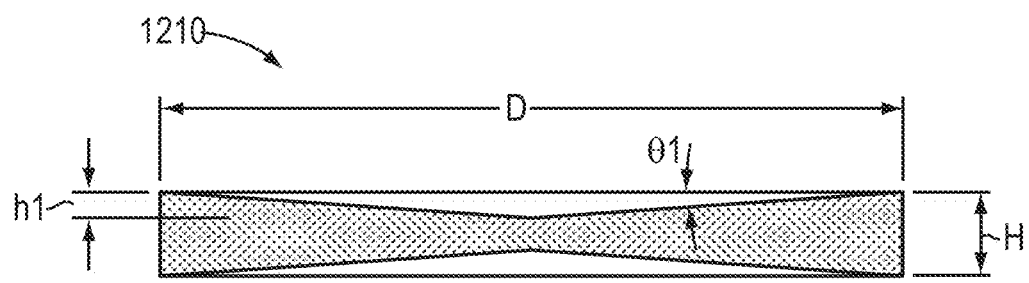
FIGS. 12B and 12C depict geometric design parameters of axicon lenses in accordance with various embodiments of the invention.
Figure 12C:
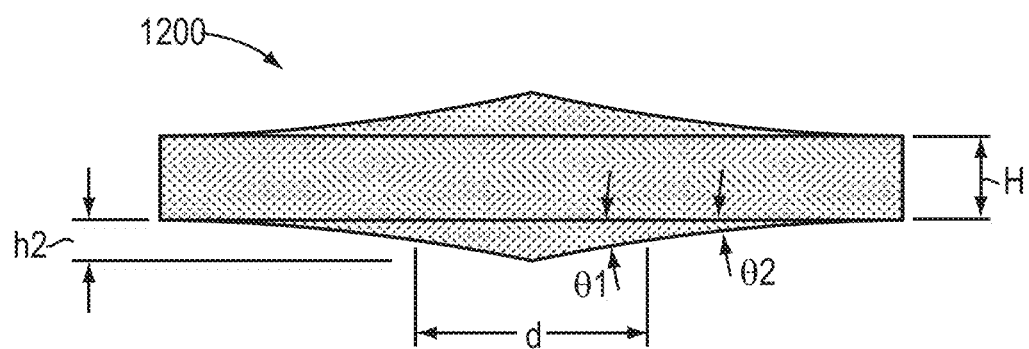

Embodiments of the invention utilize optical elements to produce annular beam shapes. Embodiments of the invention feature one or more optical elements that include, consist essentially of, or consist of axicon lenses. As known in the art, axicon lenses are lenses having at least one conical surface, and such lenses may be utilized to image a point source into a line segment along the optical axis. The conical surface of revolution is capable of blending light from a point source, which is located on the axis of revolution, by reflection or refraction, or both. Embodiments of the invention utilize a combination of a double-positive (i.e., double convex) axicon lens 1200 and a double-negative (i.e., double concave) axicon lens 1210 between the fiber end cap 505 and the collimating lens 510 as shown in FIG. 12A, and the beam size at the workpiece may be varied utilizing this lensing system. As shown, lenses 1200, 1210 are separated in the beam path by a gap distance 1220. θ1 and θ2 are the slope variables of the conic surfaces that define the maximum sags (h1 and h2) and the separation of the annular beam ring from the beam spot center as schematically drawn in FIGS. 12B and 12C. In various embodiments of the invention, the conical surfaces of one or both of lenses 1200, 1210 have smooth edges and radii of curvature less than approximately 5 μm.

Figure 13:
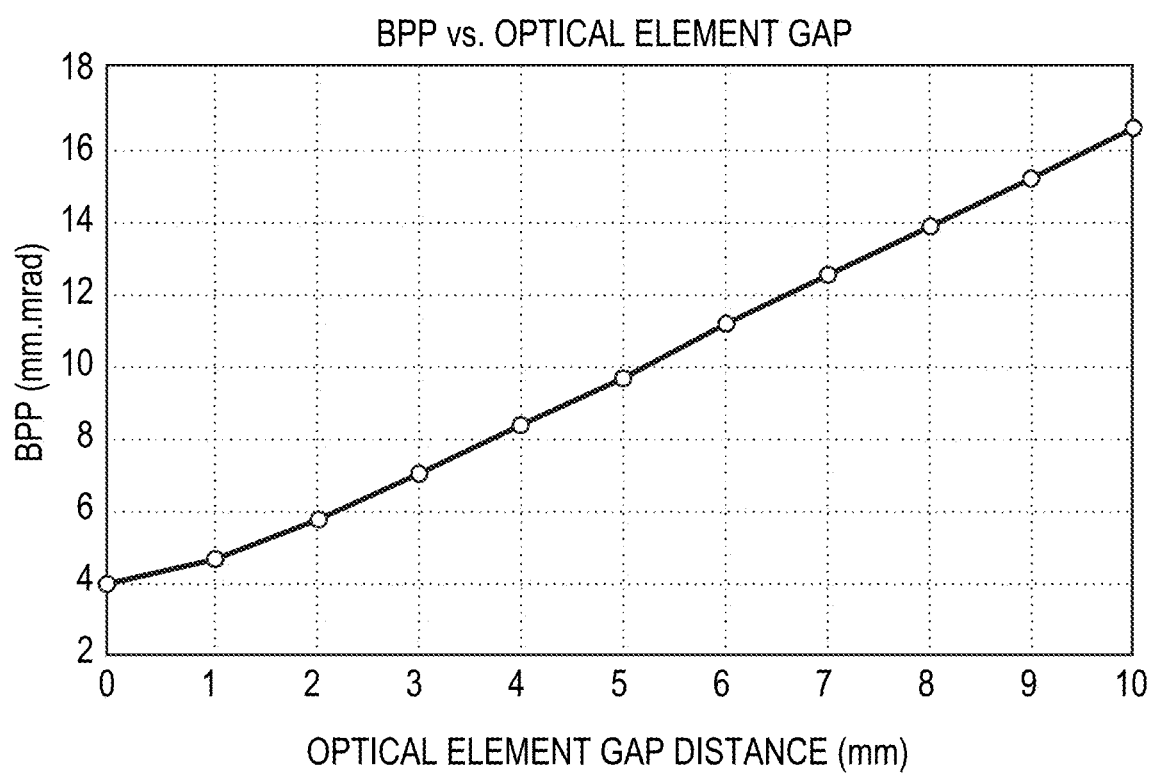
FIG. 13 is a graph of the BPP variation as a function of gap distance between positive and negative axicon lenses in accordance with various embodiments of the invention.
Figure 14:
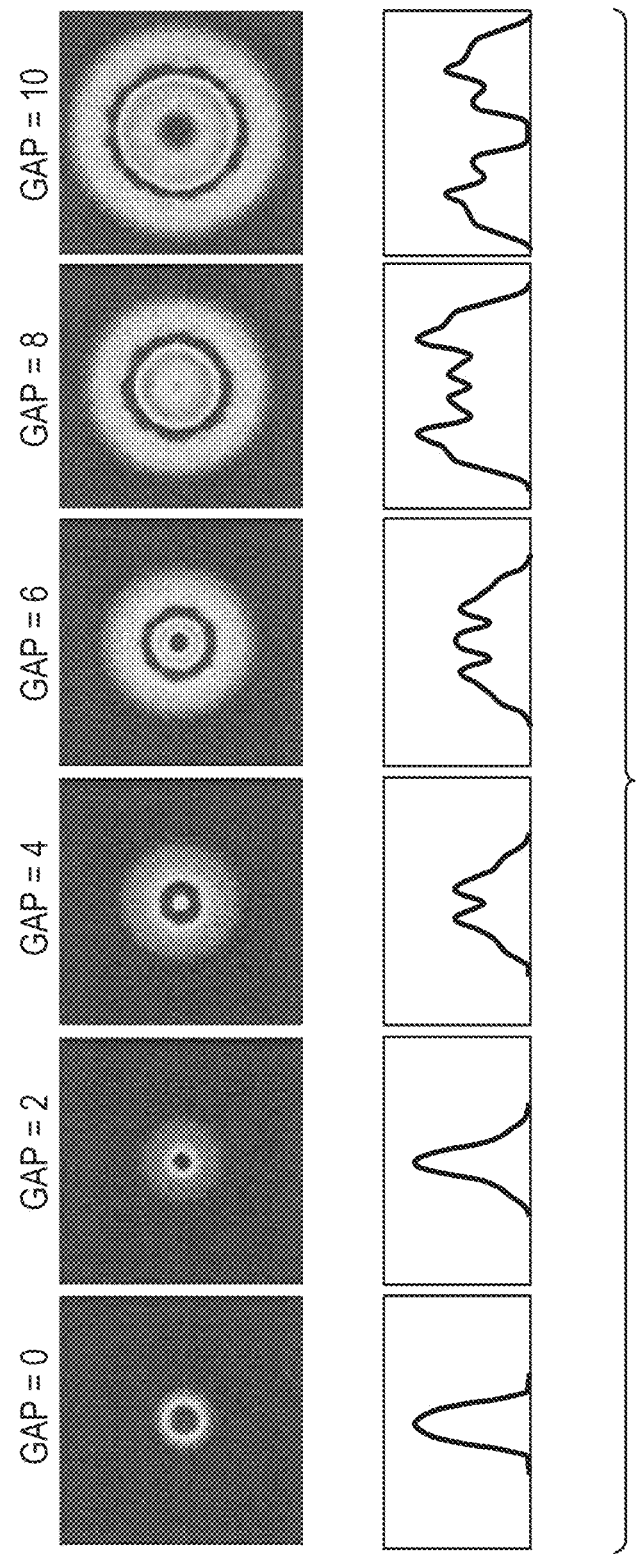
FIG. 14 depicts beam profiles at different gap distances between positive and negative axicon lenses in accordance with various embodiments of the invention.
Figure 15:
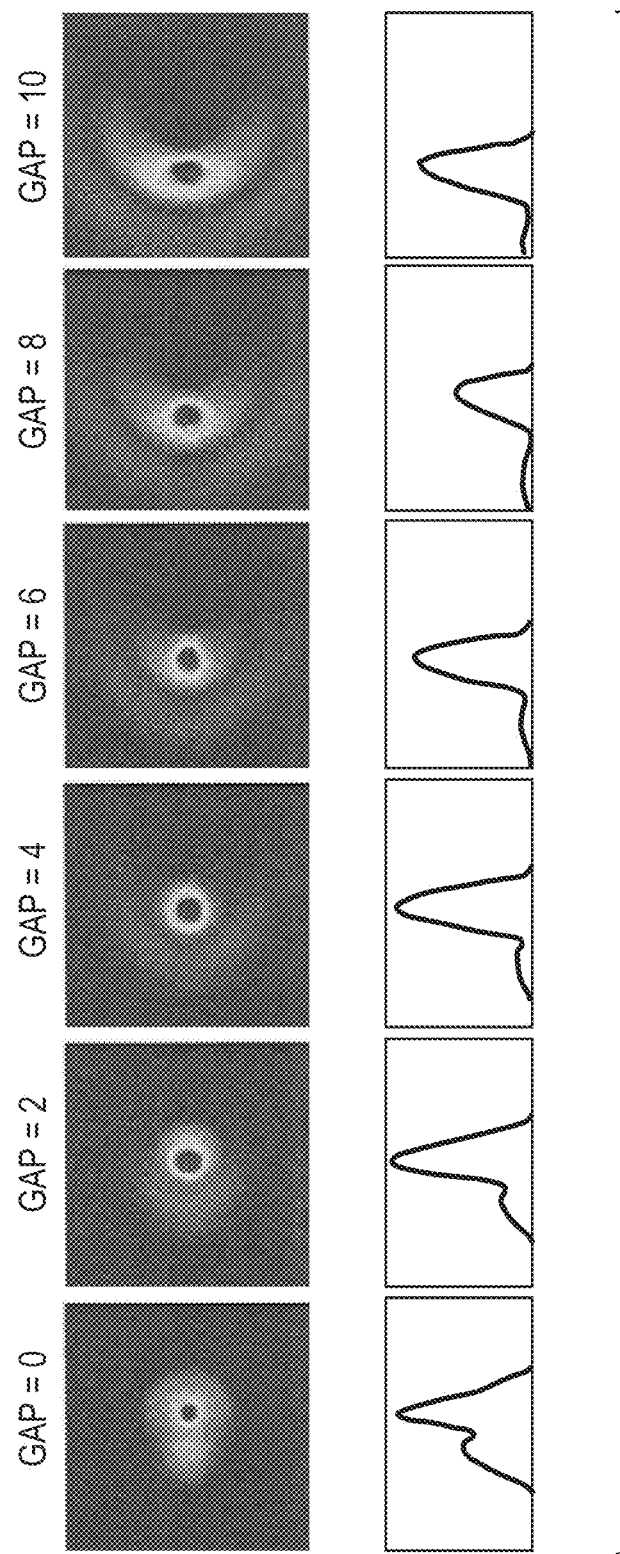
FIG. 15 depicts beam profiles at different gap distances between positive and negative axicon lenses that are transversely off-centered in the beam path in accordance with various embodiments of the invention.

FIG. 13 is a graph depicting control over the BPP of the laser delivery system as a function of the gap distance 1220 between the two axicon lenses 1200, 1210. As shown in FIG. 13, an approximate 7 mm variation in the gap distance 1220 results in a BPP increase from 4 to 12, demonstrating the wide range of BPP control enabled by such embodiments of the present invention. The beam profiles as a function of gap distance 1220 between the lenses 1200, 1210 are shown in FIG. 14, where the gap distances are listed in millimeters. As shown, adjustment of the gap distance 1220 may transform a beam profile having a single peak to one having two, three, or more peaks. FIG. 15 depicts similar beam profiles for the case in which the two axicon lenses 1200, 1210 are transversely off-center by 4 mm in the beam path and separated by the listed gap distances 1220 (gap distances are listed in millimeters).

Figure 16A:
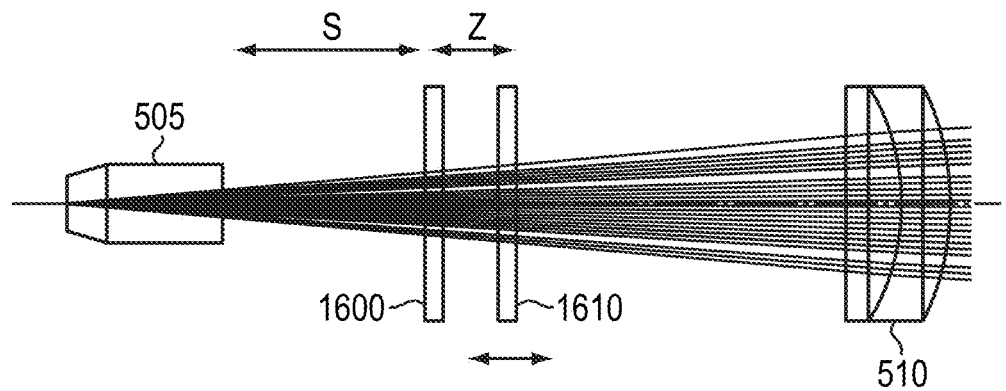
FIG. 16A is a schematic diagram of a portion of a laser delivery system having twin phase plate lenses in accordance with various embodiments of the invention.
Figure 16B:
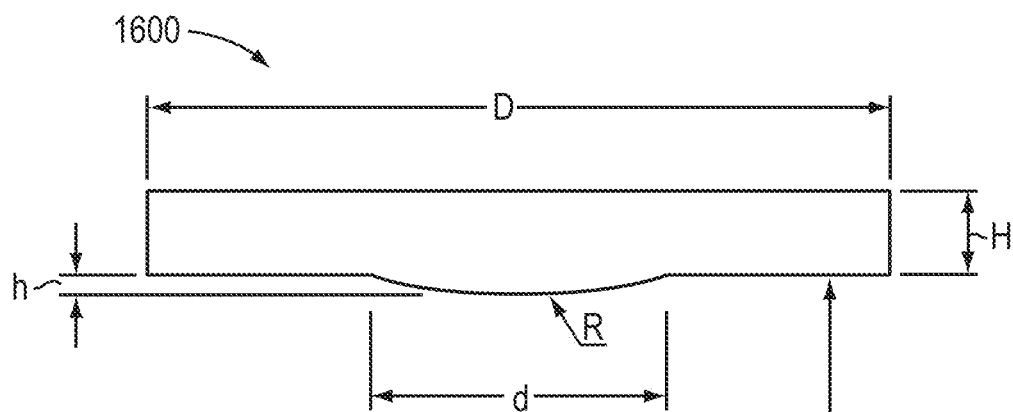
FIGS. 16B and 16C depict geometric design parameters of phase plate lenses in accordance with various embodiments of the invention.
Figure 16C:
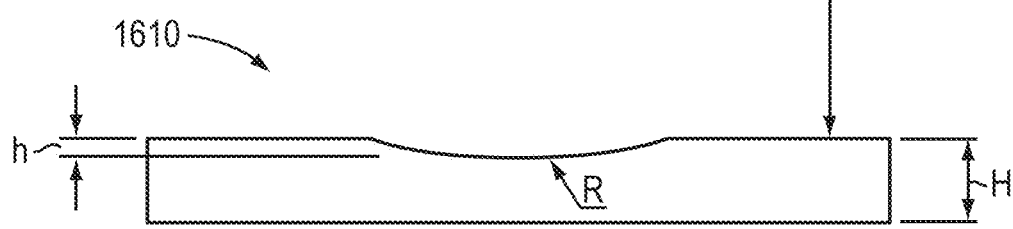

Embodiments of the invention feature one or more optical elements that include, consist essentially of, or consist of phase plates having one planar surface and an opposing surface at least a portion of which is convexly or concavely curved. FIG. 16A depicts a partial beam delivery system featuring two such plates 1600, 1610 separated by a gap Z. As shown, plate 1600 is separated from fiber end cap 505 by a distance S. FIGS. 16B and 16C depict plates 1600, 1610 in more detail. As shown, plates 1600, 1610 have an outer diameter D, and the convex/concave portions of their surfaces have an inner diameter d that defines the maximum sag h (in conjunction with R, detailed below). The thicknesses of the plates at their outer perimeters (i.e., the thicknesses between planar portions of their opposing surfaces) are represented by H, and the radii of curvature of the convex/concave portions are represented by R. As depicted in FIGS. 16B and 16C, the plates 1600, 1610 have approximately the same H, D, d, and R, although various embodiments of the invention feature twin plates (i.e., one having a partial concave surface and one having a partial convex surface) that differ in one or more of those parameters.

Table 3 provides exemplary design values for exemplary optical elements 1600, 1610 including, consisting essentially of, or consisting of two different materials, fused silica and zinc sulfide.

TABLE 3

| Optical Element Material | Fused Silica | Zinc Sulfide |
|---|---|---|
| D (mm) | 25 | 25 |
| d (mm) | 5 | 5 |

TABLE 3-continued

| Optical Element Material | Fused Silica | Zinc Sulfide |
|---|---|---|
| H (mm) | 2 | 1 |
| h (μm) | 25 | 9.3 |
| R (mm) | 500 | 1350 |

Figure 16D:
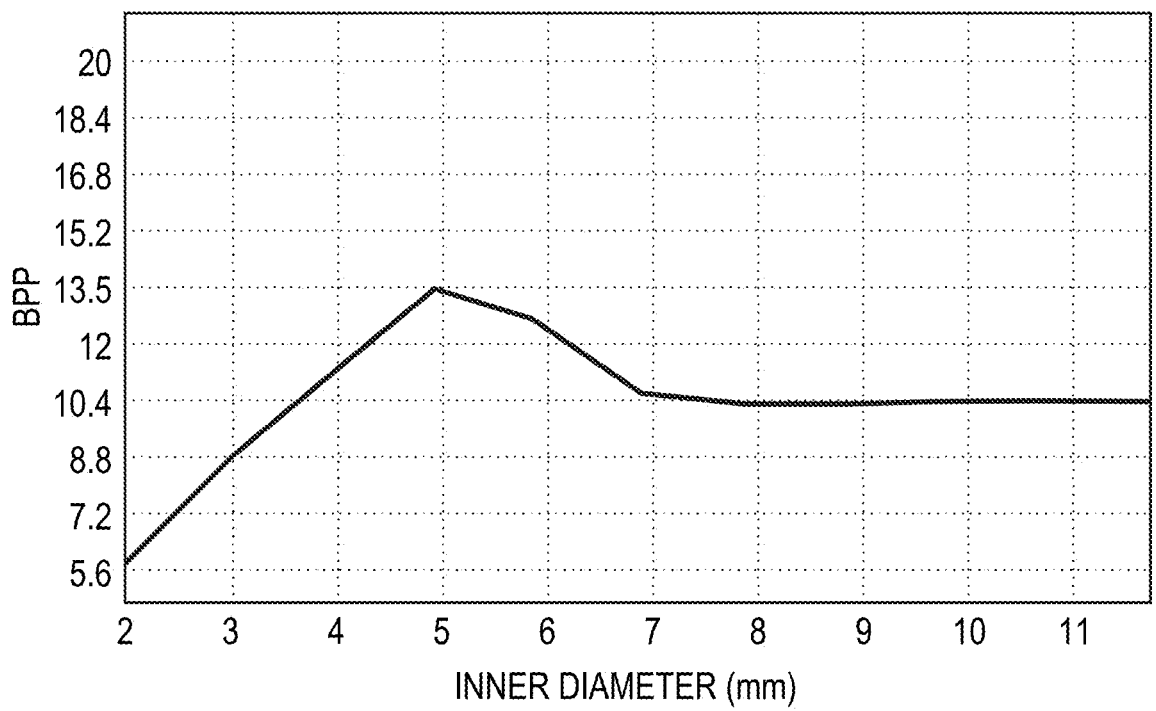
FIG. 16D is a graph of BPP as a function of the inner diameter of twin phase plates in accordance with various embodiments of the invention.
Figure 16E:
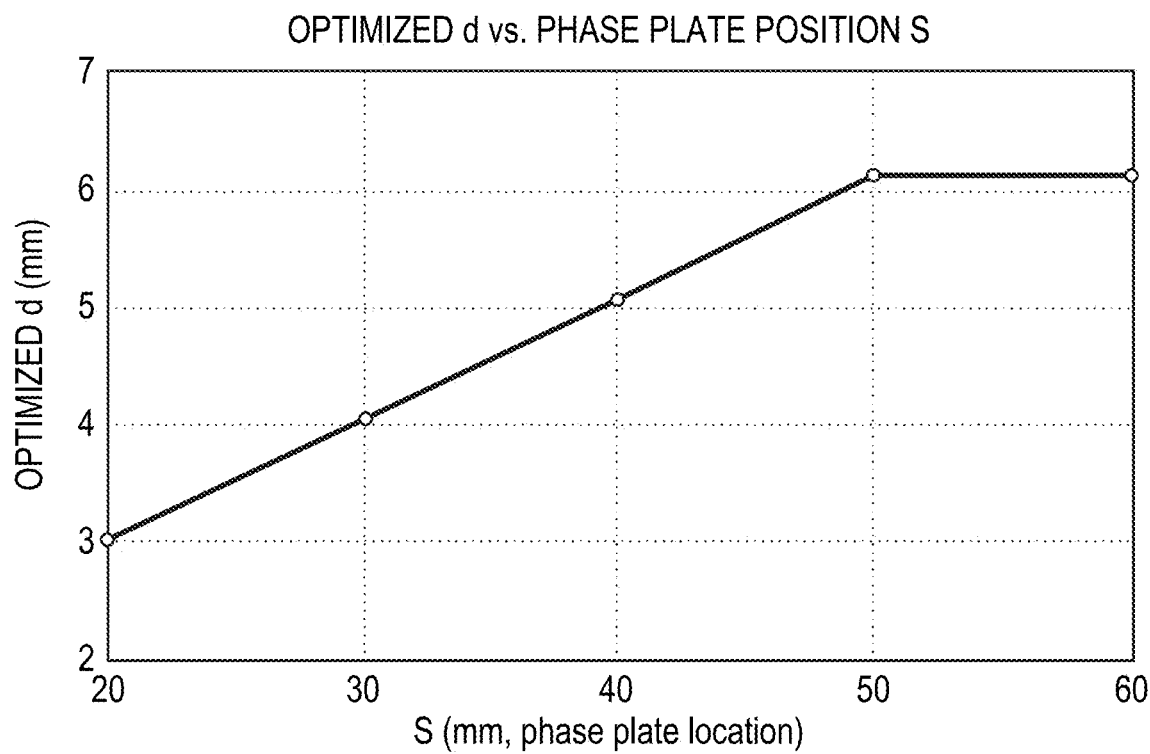
FIG. 16E is a graph of optimized inner diameter of twin phase plates as a function of separation from an input fiber end cap in accordance with various embodiments of the invention.

FIGS. 16D and 16E depict that, in accordance with embodiments of the invention, the inner diameter d of plates 1600, 1610 may be optimized to maximize the output BPP of the laser delivery system as a function of the distance S from the fiber end cap 505. FIG. 16D is a graph of BPP as a function of inner diameter d for plates 1600, 1610 having a distance S of 40 mm, a gap distance Z of 10 mm, and a radius of curvature R of 500. As shown, the resulting BPP is maximized at an inner diameter d of approximately 5 mm; this BPP is substantially independent of changes in the gap distance Z and the radius of curvature R. FIG. 16E is a graph of the optimized inner diameter d (i.e., the inner diameter d that maximizes the output BPP) as a function of the distance S between the end cap 505 and the plate 1600. As shown, an optimized inner diameter d may be selected that maximizes BPP of the output beam as a function of the distance S.

Figure 16F:
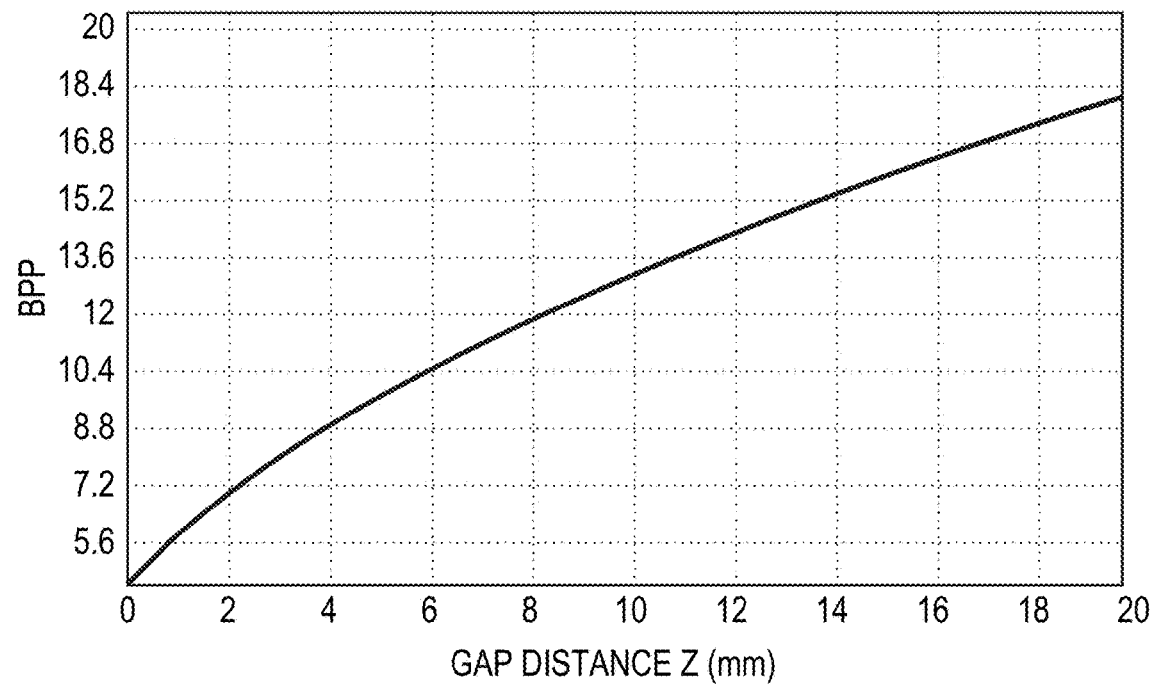
FIG. 16F is a graph of the BPP variation as a function of gap distance between twin phase plate lenses in accordance with various embodiments of the invention.
Figure 16G:
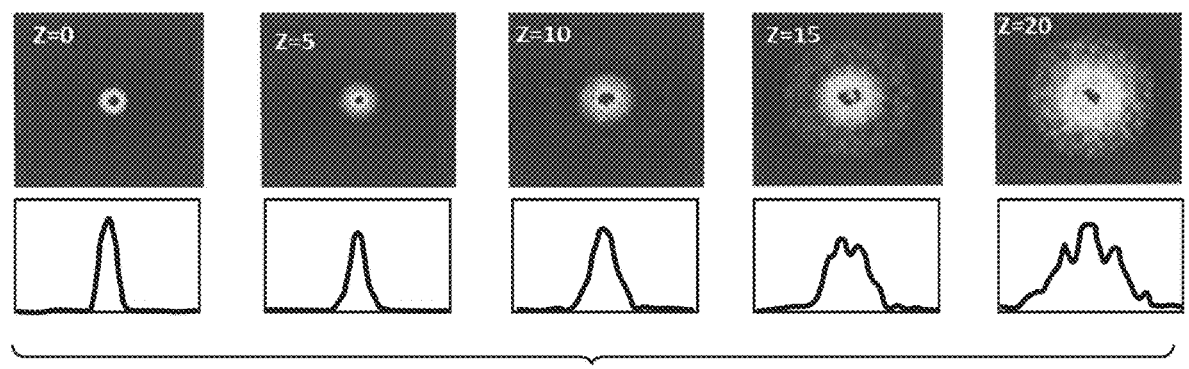
FIG. 16G depicts beam profiles at different gap distances between twin phase plate lenses in accordance with various embodiments of the invention.

FIG. 16F is a graph of BPP at different gap distances Z between plates 1600, 1610 having the design parameters provided in Table 3 (with the design parameters of Table 3, both the fused silica and zinc sulfide plates 1600, 1610 provide the same results). In the plot, the distance S to the end cap 505 is assumed to be 40 mm. As shown, the BPP of the beam may be increased from about 4 to about 12 via alteration of the gap Z between plates 1600, 1610 by approximately 9 mm. Various beam profiles of the output beam as a function of the gap Z (in mm) are illustrated in FIG. 16G, as are graphs of their irradiance as a function of position. As shown, as the beam BPP increases, the beam shape proceeds from having a single peak to having a broader, multi-peak irradiance profile.

Figure 17A:
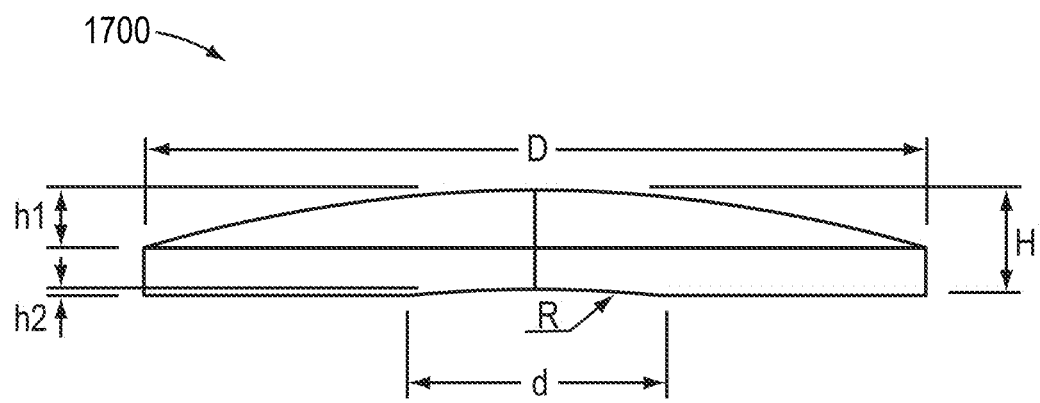
FIG. 17A is a schematic diagram of a meniscus lens optical element in accordance with various embodiments of the invention.

Optical elements in accordance with embodiments of the invention may also include, consist essentially of, or consist of meniscus lenses. The geometric design for optical elements 1700 in accordance with such embodiments is depicted schematically in FIG. 17A; as shown, in various embodiments, one surface of optical element 1700 is convexly curved over substantially the entire surface, while the opposing surface is concavely curved over a portion of the surface, defining an inner diameter d. Optical element 1700 may be utilized as optical element 520 and/or optical element 525 in delivery system 500. As shown, optical element 1700 may have an outer diameter D, inner diameter d, thickness H, maximum sag h1 of the convexly curved surface, and maximum sag h2 of the partially concavely curved surface. The radius of curvature R, which may be approximately the same for both surfaces of optical element 1700, defines the maximum sags h1 and h2, as well as the separation of the resulting annular beam ring from the beam spot center.

Table 4 provides exemplary design values for exemplary optical elements 1700 including, consisting essentially of, or consisting of two different materials, fused silica and zinc sulfide.

TABLE 4

| Optical Element Material | Fused Silica | Zinc Sulfide |
|---|---|---|
| D (mm) | 25 | 25 |
| d (mm) | 8 | 8 |
| H (mm) | 3 | 1.8 |
| h1 (μm) | 87 | 31 |
| h2 (μm) | 9 | 3.2 |
| R (mm) | 900 | 2500 |

Figure 17B:
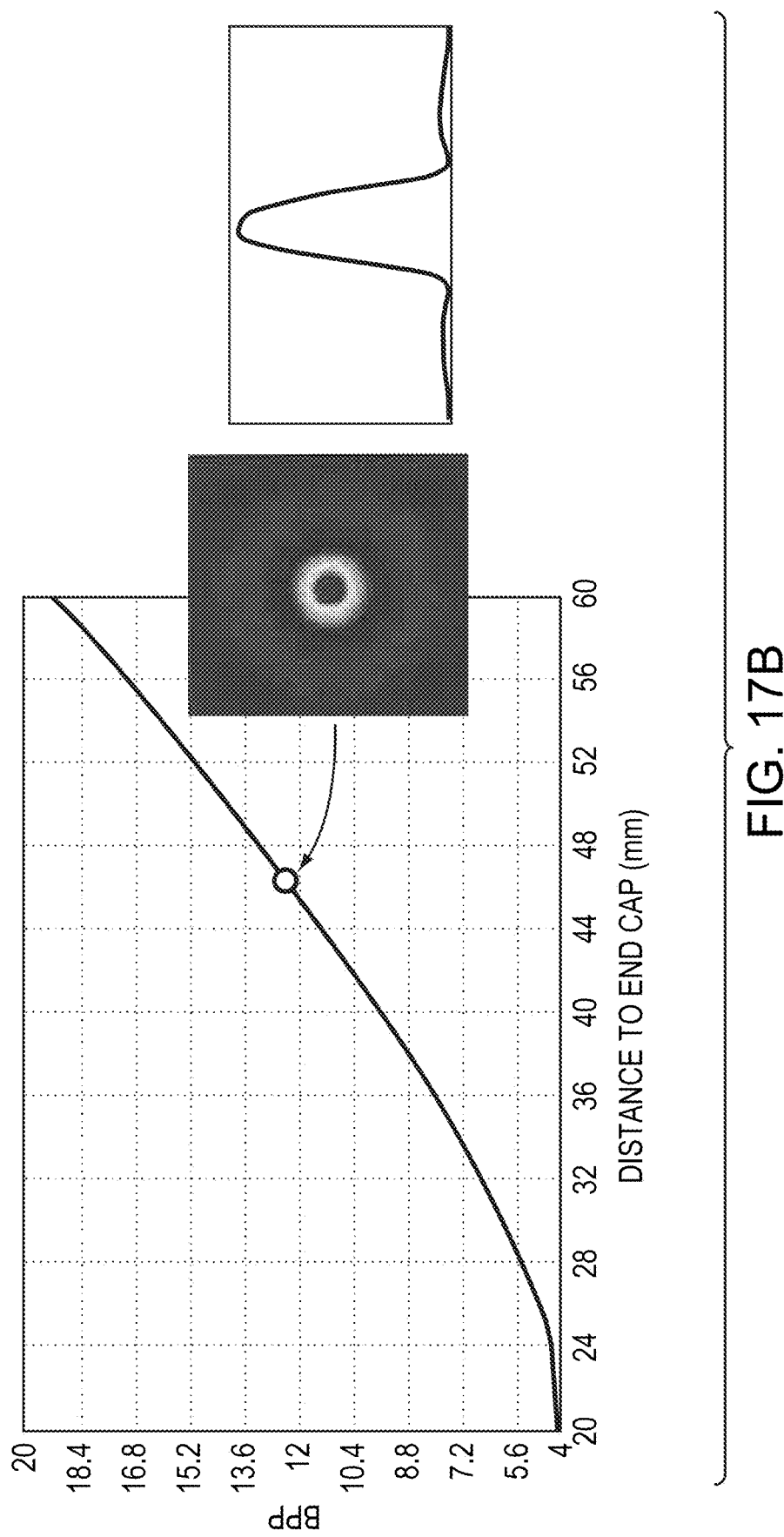
FIG. 17B is a graph of BPP variation as a function of the distance of a fused silica meniscus lens optical element from a beam source in accordance with various embodiments of the invention.

FIG. 17B is a graph of BPP at different distances from the fiber end cap 505 to the exemplary fused silica optical element 1700 having the design parameters provided in Table 4. In the plot, the initial position of the optical element 1700 is assumed to be 25 mm from the end cap 505. As shown, the BPP of the beam may be increased from about 4 to about 12 via displacement of the optical element 1700 by approximately 24 mm. The beam profile at a 46 mm distance of the optical element 1700 to the fiber end cap 505 is also shown in FIG. 17B, as is a graph of the irradiance as a function of position for the 46 mm spacing between optical element 1700 and end cap 505.

Figure 18A:
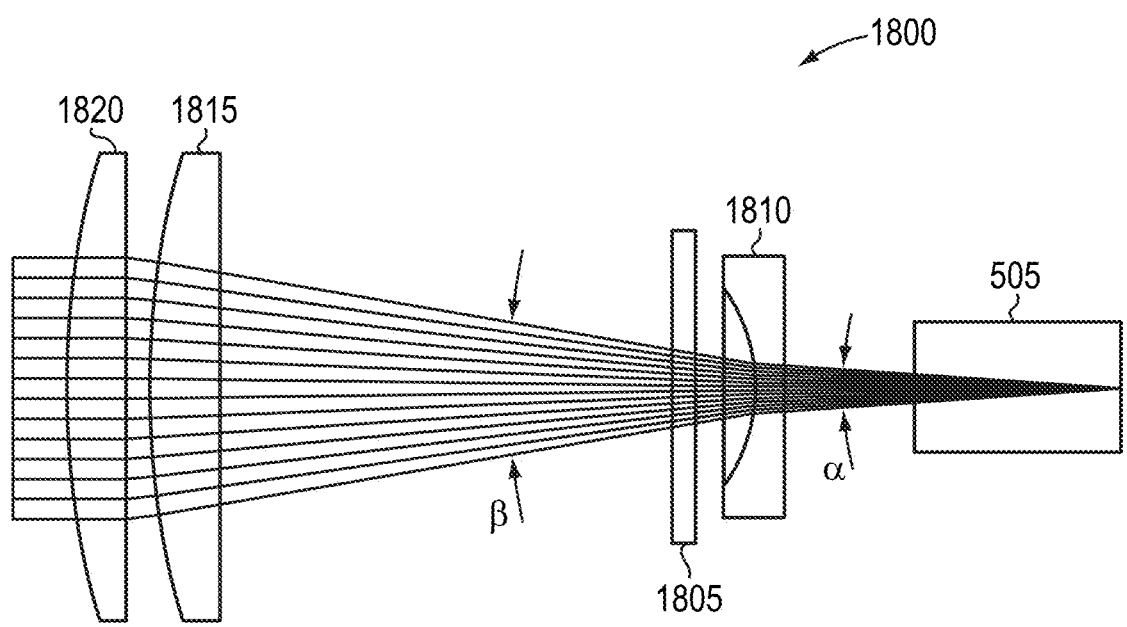
FIG. 18A is a schematic diagram of a partial laser beam delivery system incorporating a triplet collimator for increased beam divergence in accordance with various embodiments of the invention.

Laser beam delivery systems in accordance with embodiments of the present invention may also utilize various lens arrangements to form larger, more diverged input beams for BPP variation as a function of optical element movement. FIG. 18A depicts portions of a laser delivery system 1800 that incorporates a movable optical element 1805 for BPP variation and a triplet collimator for increasing divergence of the laser beam. As shown, the triplet collimator increases the divergence of the beam from an angle α to an angle β. In various embodiments, the ratio of β to α is between approximately 2 and approximately 1.5, e.g., approximately 1.74. As described in more detail below, this increased divergence enables greater control over BPP with less movement of the optical element 1805. In various embodiments, the optical element 1805 includes, consists essentially of, or consists of any one or more of optical element 600, optical element 900, optical element 1700, phase plates 1600/1610, or axicon lenses 1200, 1210.

Triplet collimators for increasing beam divergence in accordance with embodiments of the invention may be composed of various combinations of lenses. FIG. 18A depicts one such embodiment that includes a plano-concave lens 1810, a meniscus lens 1815 (e.g., a positive meniscus lens), and a plano-convex lens 1820. In various embodiments of the invention, the optical element 1805 is disposed in the beam path between plano-concave lens 1810 and meniscus lens 1815. In other embodiments, the optical element 1805 may be disposed in the beam path between meniscus lens 1815 and plano-convex lens 1820 or even optically downstream of plano-convex lens 1820.

Figure 18B:
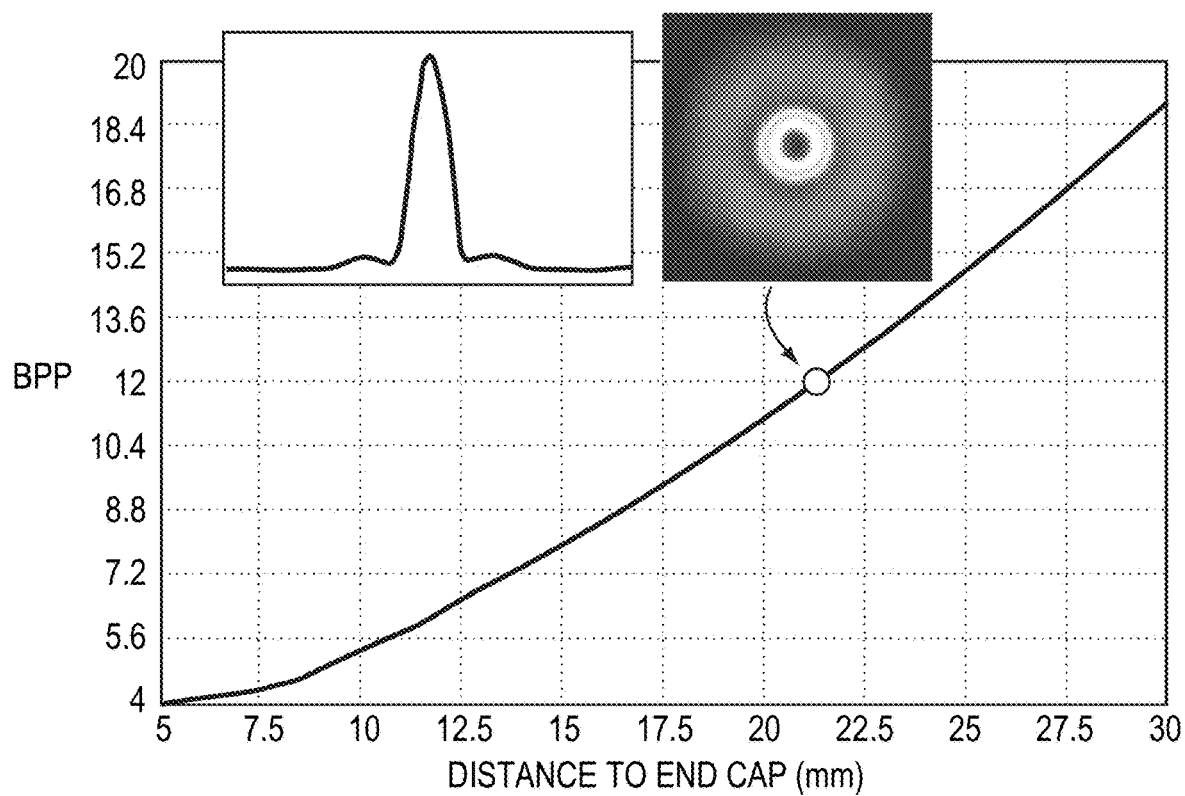
FIG. 18B is a graph of BPP variation as a function of the distance of a flat-top spherical optical element from a beam source in the laser delivery system of FIG. 18A in accordance with various embodiments of the invention.

FIG. 18B is a graph of BPP at different distances from the fiber end cap 505 to the exemplary fused silica optical element 600 having the design parameters provided in Table 1 when utilized in laser beam delivery system 1800 in conjunction with a triplet collimator for increased beam divergence. In the plot, the initial position of the optical element 600 is assumed to be 25 mm from the end cap 505. As shown, the BPP of the beam may be increased from about 4 to about 12 via displacement of the optical element 600 by only approximately 16 mm, or about a factor of 2 less displacement (i.e., greater control) when compared to the beam delivery system lacking the triplet collimator of FIG. 18A (see FIG. 7A). The beam profile at a 21 mm distance of the optical element 600 to the fiber end cap 505 is also shown in FIG. 18B.

Figure 18C:
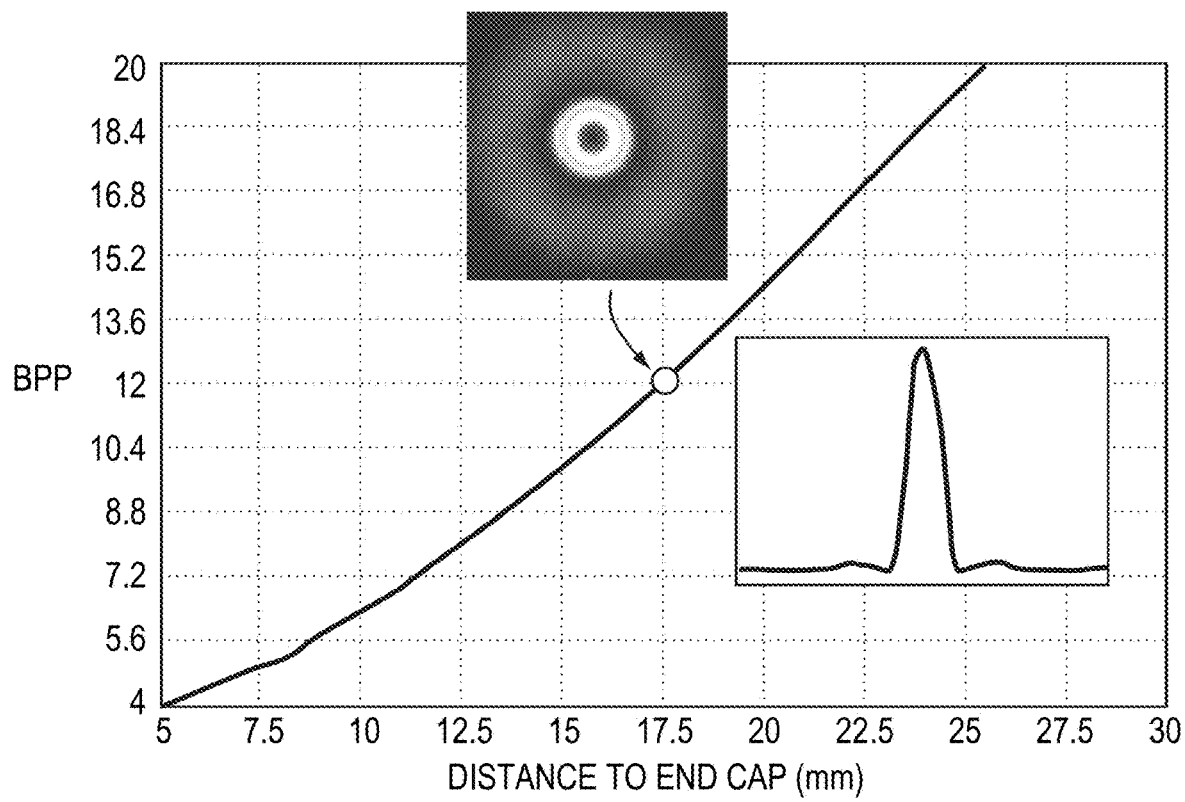
FIG. 18C is a graph of BPP variation as a function of the distance of a meniscus lens optical element from a beam source in the laser delivery system of FIG. 18A in accordance with various embodiments of the invention.

FIG. 18C is a graph of BPP at different distances from the fiber end cap 505 to the exemplary fused silica optical element 1700 having the design parameters provided in Table 4 when utilized in laser beam delivery system 1800 in conjunction with a triplet collimator for increased beam divergence. In the plot, the initial position of the optical element 1700 is assumed to be 25 mm from the end cap 505. As shown, the BPP of the beam may be increased from about 4 to about 12 via displacement of the optical element 600 by only approximately 12 mm, or about a factor of 2 less displacement (i.e., greater control) when compared to the beam delivery system lacking the triplet collimator of FIG. 18A (see FIG. 17B). The beam profile at a 17.5 mm distance of the optical element 1700 to the fiber end cap 505 is also shown in FIG. 18C.

Figure 18D:
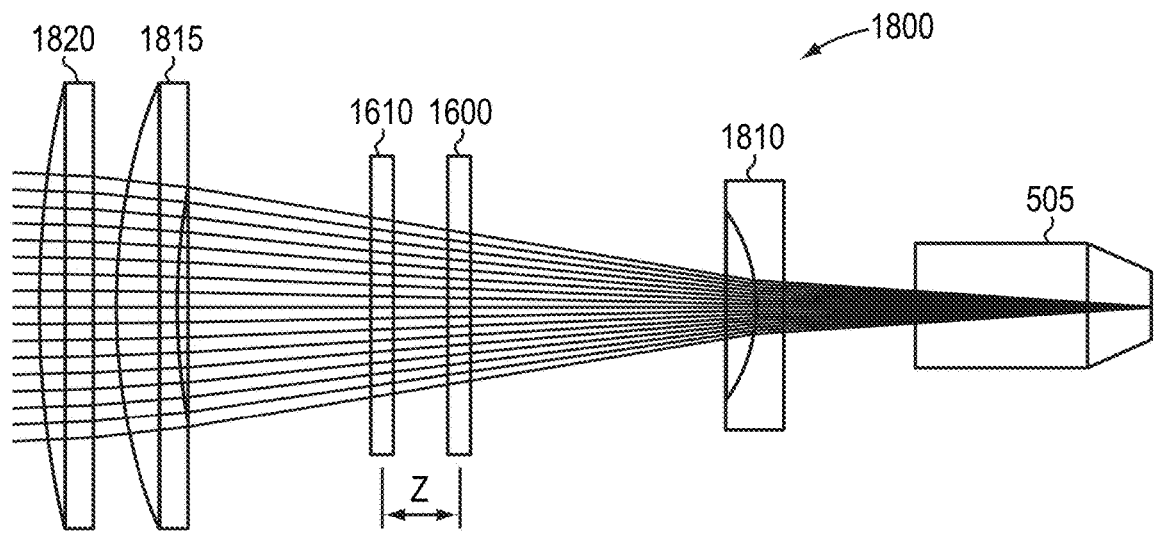
FIG. 18D is a schematic diagram of a partial laser beam delivery system incorporating a triplet collimator for increased beam divergence and twin phase plate optical elements in accordance with various embodiments of the invention.
Figure 18E:
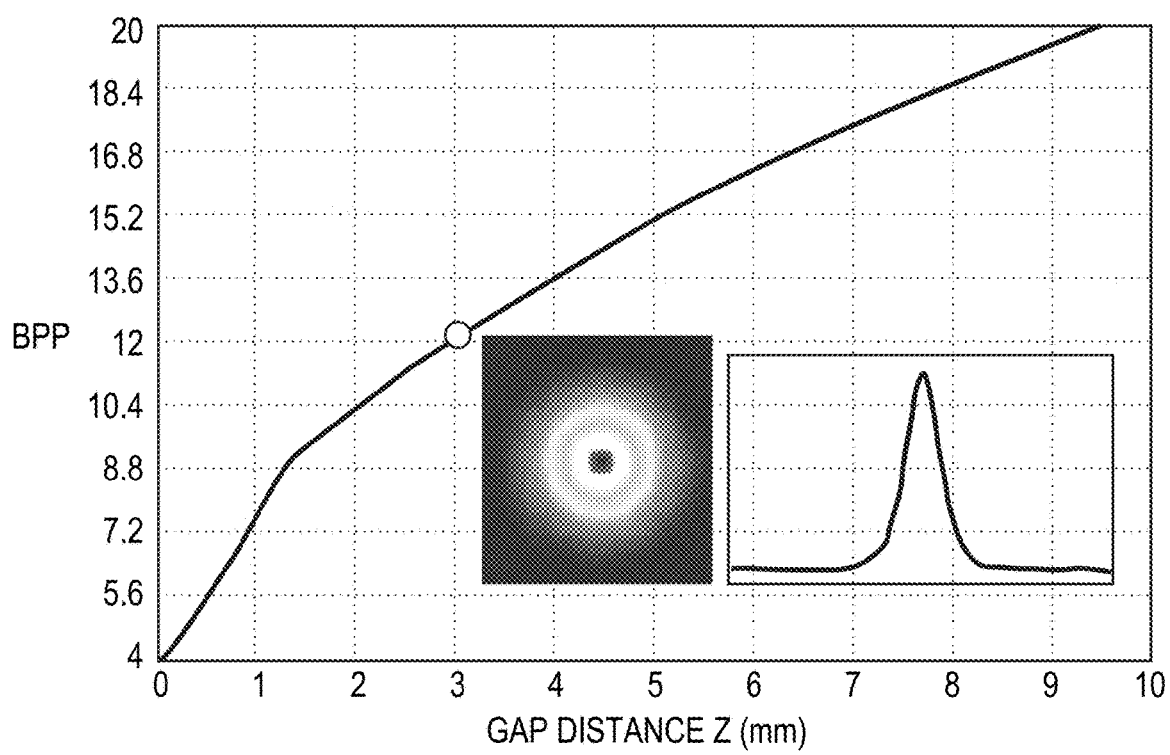
FIG. 18E is a graph of the BPP variation as a function of gap distance between the twin phase plate lenses in the laser beam delivery system of FIG. 18D in accordance with various embodiments of the invention.

FIG. 18D is a schematic of partial laser beam delivery system 1800 incorporating the twin phase plate optical elements 1600, 1610 described above separated within the beam path by a gap distance Z. FIG. 18E is a graph of BPP for different gap spacings Z of the exemplary fused silica optical elements 1600, 1610 having the design parameters provided in Table 3 when utilized in laser beam delivery system 1800 in conjunction with a triplet collimator for increased beam divergence. In the plot, the position of the optical element 1600 is assumed to be 25 mm from the end cap 505. As shown, the BPP of the beam may be increased from about 4 to about 12 via increasing the gap distance Z between the optical elements 1600, 1610 by only approximately 3 mm, or about a factor of 3 less displacement (i.e., greater control) when compared to the beam delivery system lacking the triplet collimator of FIG. 18A (see FIG. 16F). The beam profile at a 3 mm gap distance between optical elements 1600, 1610 is also shown in FIG. 18C.

Figure 19:
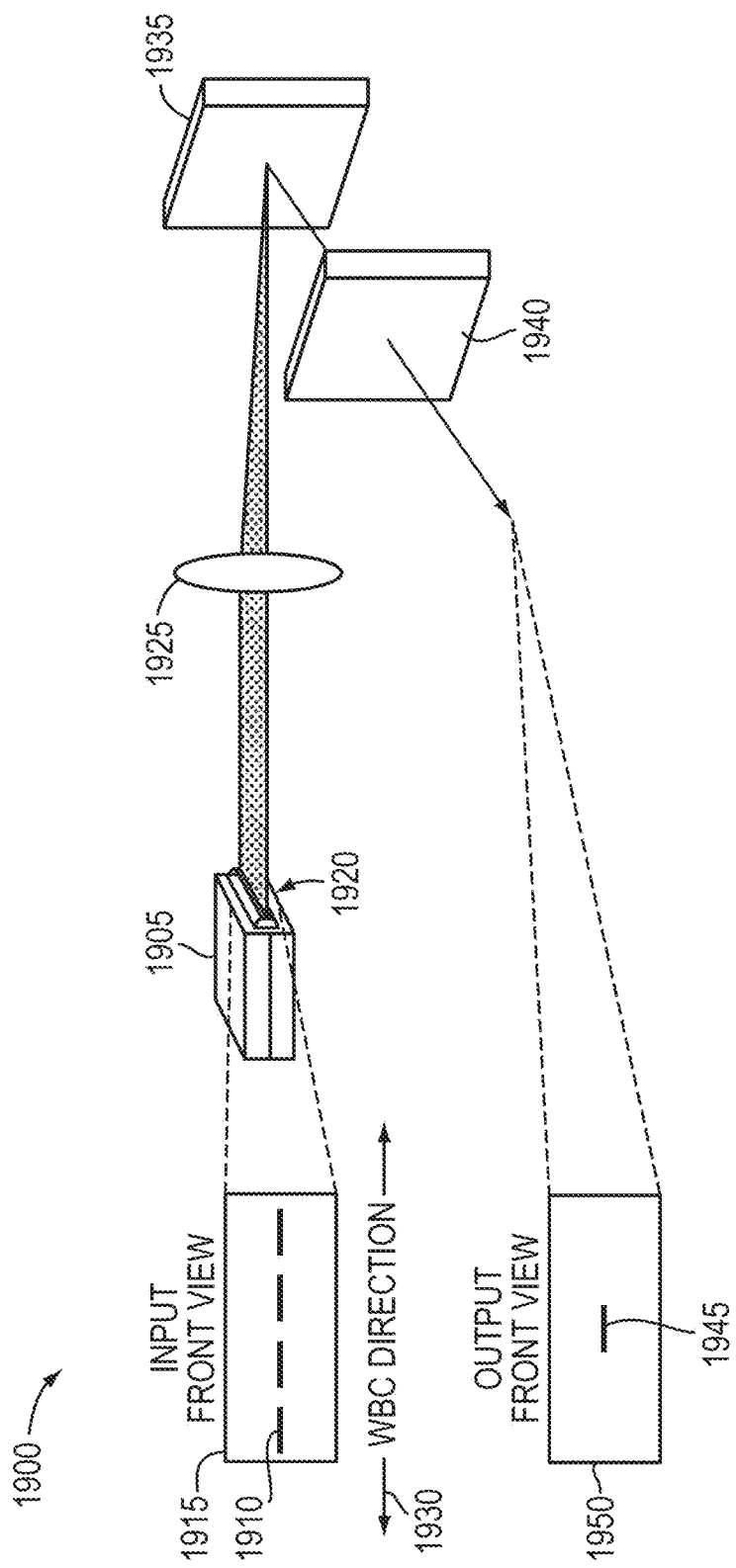
FIG. 19 is a schematic diagram of a wavelength beam combining laser system that may be utilized to supply the input beam for laser beam delivery systems in accordance with various embodiments of the invention.

Laser systems and laser delivery systems in accordance with embodiments of the present invention and detailed herein may be utilized in and/or with WBC laser systems. Specifically, in various embodiments of the invention, multi-wavelength output beams of WBC laser systems may be utilized as the input beams for laser beam delivery systems for variation of BPP, beam shape, and/or polarization as detailed herein. FIG. 19 depicts an exemplary WBC laser system 1900 that utilizes one or more lasers 1905. In the example of FIG. 19, laser 1905 features a diode bar having four beam emitters emitting beams 1910 (see magnified input view 1915), but embodiments of the invention may utilize diode bars emitting any number of individual beams or two-dimensional arrays or stacks of diodes or diode bars. In view 1915, each beam 1910 is indicated by a line, where the length or longer dimension of the line represents the slow diverging dimension of the beam, and the height or shorter dimension represents the fast diverging dimension. A collimation optic 1920 may be used to collimate each beam 1910 along the fast dimension. Transform optic(s) 1925, which may include or consist essentially of one or more cylindrical or spherical lenses and/or mirrors, are used to combine each beam 1910 along a WBC direction 1930. The transform optics 1925 then overlap the combined beam onto a dispersive element 1935 (which may include or consist essentially of, e.g., a reflective or transmissive diffraction grating, a dispersive prism, a grism (prism/grating), a transmission grating, or an Echelle grating), and the combined beam is then transmitted as single output profile onto an output coupler 1940. The output coupler 1940 then transmits the combined beams 1945 as shown on the output front view 1950. The output coupler 1940 is typically partially reflective and acts as a common front facet for all the laser elements in this external cavity system 1900. An external cavity is a lasing system where the secondary mirror is displaced at a distance away from the emission aperture or facet of each laser emitter. In some embodiments, additional optics are placed between the emission aperture or facet and the output coupler or partially reflective surface. The output beam 1945 is a thus a multiple-wavelength beam (combining the wavelengths of the individual beams 1910), and may be utilized as the input beam in laser beam delivery systems detailed herein and/or may be coupled into an optical fiber.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A system for processing a workpiece, the system comprising:
    a beam emitter;
    a positioning device for varying a position of a beam of the beam emitter with respect to the workpiece;
    a variable polarizer for varying a polarization of the beam;
    a beam shaper for varying a shape of the beam;
    a controller, coupled to the positioning device, the polarizer, and the beam shaper, for operating the beam emitter to cause the beam to traverse a path across at least a portion of the workpiece for processing thereof, and to vary the polarization and/or shape of the beam along the path based at least in part on one or more properties of the workpiece;
    a memory, accessible to the controller, for storing data corresponding to the path; and
    a database for storing polarization data for a plurality of materials,
    wherein the controller is configured to query the database to obtain the polarization data for a material of the workpiece and to vary the polarization of the beam based at least in part on the polarization data.

2. The system of claim 1, wherein the controller is configured to vary an eccentricity of the polarization of the beam based at least in part on a thickness of the workpiece.

3. The system of claim 1, wherein the controller is configured to vary the polarization of the beam between a linear polarization state and a radial polarization state.

4. The system of claim 1, wherein the variable polarizer comprises a wave plate and a rotation element, the rotation element being operated by the controller.

5. The system of claim 4, wherein the wave plate comprises at least one of a half-wave plate or a quarter-wave plate.

6. The system of claim 4, wherein the beam is linearly polarized and the controller operates the rotation element to maintain a polarization direction parallel to the path.

7. The system of claim 1, wherein the variable polarizer comprises a compensator plate, a fixed birefringent wedge disposed over the compensator plate, a movable birefringent wedge disposed over the fixed birefringent wedge, and a translation element, the translation element being operated by the controller.

8. The system of claim 1, wherein the variable polarizer comprises a radial polarization converter.

9. The system of claim 1, wherein the controller is configured to maintain a linear polarization of the beam having a polarization direction approximately parallel to the path as the beam traverses the path.

10. The system of claim 1, wherein the path includes at least one directional change.

11. The system of claim 1, wherein the beam emitter comprises:
- a beam source emitting a plurality of discrete input beams;
- focusing optics for focusing the plurality of input beams onto a dispersive element;
- a dispersive element for receiving and dispersing the received focused beams; and
- a partially reflective output coupler positioned to receive the dispersed beams, transmit a portion of the dispersed beams therethrough as the beam of the beam emitter, and reflect a second portion of the dispersed beams back toward the dispersive element,
- wherein the beam of the beam emitter is composed of multiple wavelengths.

12. The system of claim 1, wherein the beam shaper comprises:
- a collimating lens for collimating a beam received from the beam emitter;
- a focusing lens for receiving the collimated beam and focusing the beam toward the workpiece;
- disposed between the beam source and the collimating lens, an optical element for receiving the beam and altering the shape thereof; and
- a lens manipulation system for changing a position of the optical element within a path of the beam,
- wherein the controller is configured to control the lens manipulation system to vary the shape of the beam.

13. The system of claim 12, wherein the optical element comprises a lens having (i) a first surface having the shape of a truncated cone, and (ii) opposite the first surface, a second surface that is substantially planar.

14. The system of claim 12, wherein the optical element comprises a lens having (i) a first surface having the shape of a truncated sphere, and (ii) opposite the first surface, a second surface that is substantially planar.

15. The system of claim 12, wherein the optical element comprises a meniscus lens.

16. The system of claim 12, wherein the lens manipulation system is configured to position the optical element transversely off-center within the path of the beam.

17. The system of claim 12, further comprising a second optical element disposed between the focusing lens and the workpiece, wherein the lens manipulation system is configured to change a position of the second optical element within the path of the beam.

18. The system of claim 17, wherein the second optical element comprises a lens having (i) a first surface having the shape of a truncated cone, and (ii) opposite the first surface, a second surface that is substantially planar.

19. The system of claim 17, wherein the second optical element comprises a lens having (i) a first surface having the shape of a truncated sphere, and (ii) opposite the first surface, a second surface that is substantially planar.

20. The system of claim 17, wherein the second optical element comprises a meniscus lens.

21. The system of claim 1, wherein the beam shaper comprises:
- a collimating lens for collimating a beam received from the beam emitter;
- a focusing lens for receiving the collimated beam and focusing the beam toward the workpiece;
- disposed between the beam source and the collimating lens, first and second optical elements for receiving the beam and altering the shape thereof; and
- a lens manipulation system for changing at least one of (i) a position of the first optical element within a path of the beam, (ii) a position of the second optical element within the path of the beam, or (iii) a distance between the first and second optical elements,
- wherein the controller is configured to control the lens manipulation system to vary the shape of the beam.

22. The system of claim 21, wherein (i) the first optical element comprises a double-concave axicon lens and (ii) the second optical element comprises a double-convex axicon lens.

23. The system of claim 21, wherein the lens manipulation system is configured to change the distance between the first and second optical elements within the range of approximately 0 mm to approximately 20 mm.

24. The system of claim 21, wherein:
- the first optical element comprises a lens having (i) a first surface that is substantially planar, and (ii) opposite the first surface, a second surface having (a) a first portion that is convexly curved and (b) a second portion that is substantially planar; and
- the second optical element comprises a lens having (i) a first surface that is substantially planar, and (ii) opposite the first surface, a second surface having (a) a first portion that is concavely curved and (b) a second portion that is substantially planar.

25. The system of claim 21, wherein the lens manipulation system is configured to position at least one of the first optical element or the second optical element transversely off-center within the path of the beam.

26. The system of claim 1, wherein the one or more properties of the workpiece comprise a composition of the workpiece.

27. The system of claim 1, wherein the database stores process parameters related to types of processing and beam parameters for carrying out the types of processing.

28. The system of claim 27, wherein the types of processing comprise cutting.

29. The system of claim 27, wherein the types of processing comprise one or more of welding, soldering, drilling, or etching.

* * * * *